(12) United States Patent
Abeykoon et al.

(10) Patent No.: US 11,328,163 B2
(45) Date of Patent: May 10, 2022

(54) METHODS AND APPARATUS FOR AUTOMATED SURVEILLANCE SYSTEMS

(71) Applicant: HITACHI, LTD., Tokyo (JP)

(72) Inventors: Abeykoon Mudiyanselage Hunfuko Asanka Abeykoon, Singapore (SG); Yoriko Kazama, Singapore (SG); Wujuan Lin, Singapore (SG)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/757,633

(22) PCT Filed: Oct. 25, 2017

(86) PCT No.: PCT/SG2017/050535
§ 371 (c)(1),
(2) Date: Apr. 20, 2020

(87) PCT Pub. No.: WO2019/083442
PCT Pub. Date: May 2, 2019

(65) Prior Publication Data
US 2020/0334470 A1 Oct. 22, 2020

(51) Int. Cl.
*G06Q 90/00* (2006.01)
*G08B 21/00* (2006.01)
(Continued)

(52) U.S. Cl.
CPC ....... *G06K 9/00771* (2013.01); *G08B 25/006* (2013.01)

(58) Field of Classification Search
CPC ................ G06K 9/00771; G08B 25/006
See application file for complete search history.

(56) References Cited

U.S. PATENT DOCUMENTS 8,564,661 B2 10/2013 Lipton et al.
2007/0103292 A1* 5/2007 Burkley .............. G07C 9/28
340/539.13
(Continued)

FOREIGN PATENT DOCUMENTS

JP 2017-033371 A 2/2017
WO 2016/132734 A1 8/2016
(Continued)

OTHER PUBLICATIONS

English Translation of International Search Report, PCT/SG2017/050535 dated Jun. 29, 2018, 3 pgs.
(Continued)

*Primary Examiner* — Thai Q Tran
*Assistant Examiner* — Jose M Mesa
(74) *Attorney, Agent, or Firm* — Volpe Koenig

(57) ABSTRACT

Systems and methods to automate both emergency identification and emergency response to minimize response time while optimizing the dispatching of different types of first responders are provided. The system may include an automation system. The automation system may receive a plurality of data elements from a plurality of sensors. The automation system may extract a set of features from the plurality of data elements. The automation system may identify an emergency situation based on the set of features and a set of rules. The automation system may assess the priority of the emergency situation based on a set of data elements associated with the emergency situation and a set of policies. The automation system may select a responder in response to the identified emergency situation. The automation system may dispatch the selected responder to an area related to the identified emergency situation.

26 Claims, 18 Drawing Sheets

(51) Int. Cl.
*G08B 21/02* (2006.01)
*G06K 9/00* (2022.01)
*G08B 25/00* (2006.01)

(56) References Cited

U.S. PATENT DOCUMENTS

| | | | |
|---|---|---|---|
| 2009/0128628 A1* | 5/2009 | Reinitz | H04N 21/643 |
| | | | 348/143 |
| 2010/0231714 A1 | 9/2010 | Flores et al. | |
| 2010/0280836 A1* | 11/2010 | Lu | G08B 7/062 |
| | | | 705/1.1 |
| 2015/0112883 A1* | 4/2015 | Orduna | H04L 67/12 |
| | | | 705/325 |
| 2017/0092109 A1* | 3/2017 | Trundle | B60L 53/305 |
| 2017/0287317 A1 | 10/2017 | Tavares | |
| 2018/0276983 A1 | 9/2018 | Tani et al. | |

FOREIGN PATENT DOCUMENTS

| | | |
|---|---|---|
| WO | 2017/022268 A1 | 2/2017 |
| WO | 2017/079354 A1 | 5/2017 |

OTHER PUBLICATIONS

Japanese Office Action dated Jun. 1, 2021 for Japanese Patent Application No. 2020-520648.
Japanese Office Action dated Aug. 31, 2021 for Japanese Patent Application No. 2020-520648.

* cited by examiner

METHODS AND APPARATUS FOR AUTOMATED SURVEILLANCE SYSTEMS

TECHNICAL FIELD

Various aspects of this disclosure generally relate to surveillance systems, and more particularly, to automation of surveillance systems used for fast emergency identification and fast emergency response.

BACKGROUND

Emergency situations or incidents are inevitable and may occur at any time in anywhere. These emergency situations may arise from natural disasters, terrorist activities, crimes, safety and security or any other situation which demands attention to mitigate risks, save lives, properties, evidence, and environment. In order to respond to these emergency situations, multiple types of first responders or emergency response providers may be dispatched in different quantities based on severity of an emergency situation or incident. First responders may consists of security, police, military, fire responders, emergency medical staff and so on who may be assigned to handle a set of tasks during an emergency situation or incident. To mitigate or minimize risks effectively in an emergency situation, it is important to minimize response time and provide right information to right people at right time.

However, emergency situations are often complex. In some cases, a large geographical area such as a region, a city, or countries are considered for emergency identification and response. In such context, multiple types of emergency situations may take place in day-to-day life with different severity or risk levels and require different types of first responders to mitigate risks. When a high priority terrorist is detected and on the way to stage an attack or a car/person is hijacked, the threat is not static but moving. Such moving target of interest requires security, police, or military to have precise and comprehensive instructions to engage and mitigate risks effectively. Further, in a situation of natural disaster like hurricane, flooding, or the like, many types of emergency situations may take place at a particular time when the first responders available may not be adequate to mitigate risks effectively. Thus, fast emergency identification and fast emergency response is a challenging problem especially for larger geographical areas with multiple types of emergencies.

In order to make the emergency identification and response more efficient, information systems and solution are being used by the end users such as first responders and their commanders, supervisors, and so on. However, traditional solutions are not able to identify or easily modified to detect wide range of emergencies with different level of priorities. In other words, traditional solutions are largely based on a fixed set of rules or a fixed set of situation analytics capabilities which requires more computational resources to improve emergency identifications capabilities or system integration efforts and difficult to add new emergency identification rules in real-time. However, a larger and generic surveillance system that monitors larger geographical areas such as cities may require more flexibility due to complexities in societies. The limitations of the traditional solutions in achieving fast, accurate, and dense emergency identification may pose risks to public safety and security.

Once an emergency situation is identified, minimizing the response time to the emergency situation is crucial. However, in a complex larger surveillance area where multiple types of first responders are deployed, planning operations and dispatching remain a key challenge. Traditional operations planning are largely based on manual planning by human operators such as commanders or operation supervisors or the like, which is time consuming and inefficient when a large surveillance area is involved. Moreover, it might be costly to allocate a lot of manpower for emergency monitoring, operations planning, and control operations. Even though traditional solutions are capable of notifying first responders upon detection of an emergency situation, those notifications are distributed without considering prior planning or optimization regarding multiple emergencies with different severities that may take place at a particular time. Furthermore, once first responder are allocated to engage in an emergency situation, providing necessary instructions and information have been a key challenge due to the lack of a rich automation system for emergency response. Command centers that monitor the overall situation to make necessary decisions are not aware of the situation on the ground while an emergency response operation is ongoing. This delay in planning operations when an emergency situation is detected poses greater risks to public safety and security, and properties as well.

In order to minimize risks of emergency situations, fast and accurate emergency identification and fast emergency response is desirable to minimize the time from the moment emergency situation taking place to responding by first responders.

A prior art (U.S. Pat. No. 8,564,661) discloses a video analytic rule detection system. The prior art extracts event occasion and broadcast a single stream of video primitive to separate applications in different parts of an organization. And a user tasks the system by defining rules and corresponding responses using interfaces in the prior art system. If a surveillance system requires a user to input rules and corresponding responses for each of the emergencies one by one, it will be difficult for the surveillance system to be applied to a complex larger geographical area. Therefore, the prior art system is not capable of dispatching first responders efficiently to various types of emergencies in a larger geographical area.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect of the disclosure discloses systems and methods to automate both emergency identification and emergency response to minimize response time while optimizing the dispatching of different types of first responders such as security, fire, police, paramedic, etc. Moreover, one aspect of the disclosure provides solutions to improve situation awareness capability of both commanders and supervisors, first responders, public, or the like regarding emergency situations, operations, and performance. Furthermore, one aspect of the disclosure discloses methods to deploy first responders optimally prior to an emergency situation taking place in order to further reduce response time. In addition, one aspect of the disclosure discloses methods to manage a large scale automated surveillance system considering system resources, accessibilities, and so on.

In an aspect of the disclosure, a method and an apparatus for an automated surveillance system is provided. The system may include an automation system. The automation system may receive a plurality of data elements regarding a surveillance area from a plurality of sensors. The automation system may extract a set of features from the plurality of data elements. The automation system may identify an emergency situation based on the set of features and a set of rules. The automation system may assess the priority of the emergency situation based on a set of data elements associated with the emergency situation and a set of policies. The automation system may select a responder in response to the identified emergency situation. The automation system may dispatch the selected responder to an area related to the identified emergency situation.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
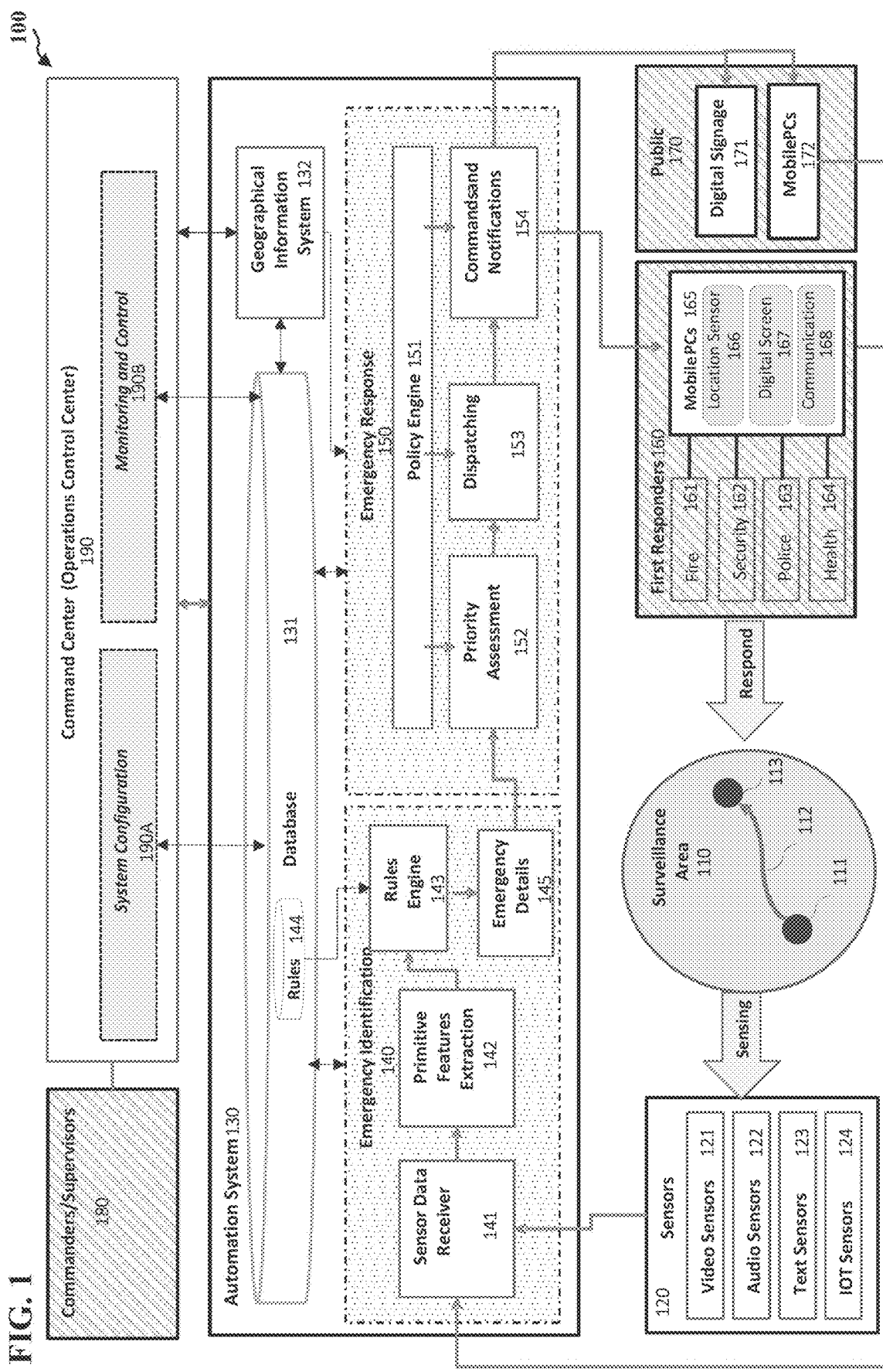
FIG. 1 is a diagram illustrating an exemplary automated surveillance system in accordance with some embodiments of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of an automated surveillance system will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), a flash memory, optical disk storage, magnetic disk storage, other magnetic storage devices, combinations of the aforementioned types of computer-readable media, or any other medium that can be used to store computer executable code in the form of instructions or data structures that can be accessed by a computer.

Emergency situations pose greater risks to public safety and security. Fast and accurate emergency identification, fast risk assessment of emergency situations, and fast emergency response are vital to reduce the risks effectively and save lives, properties, or critical evidences. In order to monitor emergency situations including crimes, threats, disasters, or any other abnormalities, varieties of sensors may be monitored by different types of first responders such as fire responders, police, security, daily maintenance staffs, and so on. The sensors used to monitor such incidents may include various types of surveillance cameras, IoT (internet of things) sensors, or even can be coupled with channels connecting general public.

There may be hundreds or thousands of sensors deployed to identify emergencies using computer aided systems. These computer aided systems may use various data analysis, pattern recognition, and rule mining systems to recognize events that are emergency situations. However, these pattern recognition and rule mining systems that support emergency situation identification are largely based on pre-defined set of rules and may be difficult to modify based on day-to-day changing needs without a major computer aided system modification, which requires time and effort. In order to solve this problem, a rule based emergency identification system is introduced. The rule based emergency identification system may be easily modified in real-time and provide flexibility to define rules and change/modify rules at any time. By allowing such rules to be added and modified in real-time with flexibility, the capability to detect or identify more types of emergencies in real-time with different priority levels is expanded. The priority level of an emergency may be related to the risk and impact of the emergency.

In addition to fast emergency identification, fast emergency response is essential for fast risks mitigation. Emergency response may depend on the nature of the emergency identified. Based on the type of emergency, different types of first responders may be required in different quantities. Such decision making in emergency response may be needed based on the severity level and the type of the emergency once an emergency situation is identified. One aspect of the disclosure introduces methods of making decisions on emergency situations based on automatically decided priority of an emergency by incorporating a rules engine that is capable of detecting emergency situations in real-time. Furthermore, these decisions on emergency situations may be made using a policy engine that incorporates rules definition, nature of emergency, and historical information about emergency situations. Based on type of emergency, priority, rules definition for emergency identification and other emergency situations ongoing in the area of interest, the number of first responders from different first responder types may be decided automatically to respond to emergency situation. In some embodiments, based on the priority level of an emergency situation, a decision may be made to respond to or ignore the emergency situation.

Once a particular emergency situation is identified, the priority level of the emergency situation, the number of first responders required for different types of first responders may be decided automatically. Afterwards, this disclosure introduces methods to allocate specific first responders of different types based on the quantities automatically decided for different types of first responders. This allocation of specific first responders to respond to a particular emergency situation may be based on their current locations and historical emergency situations density. In other words, this disclosure introduces methods to deploy first responders in certain locations based on emergency situations prediction to further minimize emergency response time when an actual emergency situation takes place in such locations. In order to provide the command and notifications faster, mobile devices such as mobile personal computer (PC) or mobile phone may be carried by first responders to receive commands, notifications, or instructions.

While there are many emergency situations take place in a larger surveillance area, situation awareness may be vital to provide a fast and efficient emergency response. In an integrated surveillance system with large number of users who are different types of first responders with different seniority levels, it may be vital to provide right information to right people at right time to provide an efficient and effective emergency response, to make decisions, and to analyze the performance of overall operations. This disclosure also describes methods to provide situation awareness based on emergency situation and the nature of first responder who demands different types of information about situation at different times. Furthermore, these situation awareness may be provided via mobile device, mobile PCs, and command center applications that can be used to centralize monitoring and control of overall situation. In one embodiment, the methods for providing situation awareness may be based on aforementioned rules engine and policy engine where situation information is personalized based on needs of individual first responders, group of first responders, type of responders, access and authorization levels, and based on hierarchical structures of seniority. In addition to first responders, this disclosure also introduces methods to alert targeted public to avoid any impact from emergency situations or to get support in mitigating risks.

By enabling a dense emergency identification with different priority levels and enabling a rich situation awareness between command centers and first responders, valuable information such as emergency densities, histories over a large surveillance area, first responders' deployment data, their location, and other related data may be captured. In addition, geographical primitives such as traffic, road conditions, congestion and so on may be analyzed. Therefore, these data or information sources may be further incorporated to predict future emergencies that may take place and pre-assign first responders based on predictions to make the emergency response even faster when an emergency situation takes place. Moreover, methods and indexes are introduces to evaluate performance, situation, quality of first responders deployment and so on. In addition to emergency identification in real-time, methods to conduct investigations and manage evidences are also described.

The automated surveillance system and methods of some embodiments may be used by large number of first responders of different types and seniority levels who are located at different geographical locations. The automated surveillance system and methods of some embodiments may be used by public, external services and so on while handling large amount of sensitive data and information. These conditions bring unique challenges such as system resources management, access control and authorization, and personalization of information. Therefore, this disclosure further describes methods of handling aforementioned challenges automatically or semi automatically based on an automated surveillance system disclosed herein.

One aspect of the disclosure provides systems, apparatus, and methods that automate both emergency identification and response for large and complex surveillance environments where emergency situations may change on day-to-day basis and multiple types of first responders are engaged. Moreover, one aspect of the disclosure describes methods of providing advanced situation awareness. Furthermore, one aspect of the disclosure provides methods of further optimizing the automation of emergency identification and response by emergency predictions, performance evaluations and so on.

Some embodiments of the disclosure are directed to techniques and arrangements which may be used in automated surveillance through automatic and real-time emergency identification and automated emergency response. These emergency situations may arise from natural disasters, terrorist activities, crimes, safety and security or any other situations that demand attention to mitigate risks, save lives, properties, evidence, and environment that leads to better safety and security of general public. In order to respond to these emergency situations, multiple types of first responders or emergency response providers may involve in different quantities based on severity of an emergency situation or incident. First responders may consists of security, police, military, fire responders, emergency medical staff or the like who will be assigned to handle a set of tasks during an emergency situation or incident and mitigate risks effectively based on the first responder's profession.

To mitigate or minimize risks effectively in an emergency situation, automated surveillance systems may be directed to combine fast and real-time emergency identification methods with fast response automation methods. Overall system is aimed to minimize time from the moment emergency situation takes place to the moment response is provided by dedicated first responders of different types. Furthermore, situation awareness requirements of different first responders at different levels are taken into consideration to make the emergency response operations more effective by providing right information to right people at right time.

For discussion purposes, some embodiments may be described in the context of a computing device performing multimedia analysis. However, implementations of the disclosure are not limited to the particular examples provided, and may be extended to other types of devices, other execution environments, other system architectures, and so forth, as will be apparent to those skilled in the art in light of the disclosure herein.

FIG. 1 is a diagram illustrating an exemplary automated surveillance system 100 in accordance with some embodiments of the disclosure. The system 100 may be used for large scale automated surveillance where emergency identification and emergency response is automated. For instance, the system 100 may be used to identify emergencies in a certain surveillance area 110. The system 100 may include a plurality of sensors 120 used to get data, information, insights on the surveillance area 110. The system 100 may include an automation system 130 that is connected to commanders or supervisors 180, first responders 160, and general public 170 to mitigate risks of emergencies effectively. The automation system 130 may be connected to one or more command centers 190 (which may also be referred to as operations control center), which allows commanders or supervisors 180 to monitor (e.g., sensor data, situation, and events) and control (e.g., first responders, the automation system 130 and its functionality, etc.) via a motoring and control component 190B. The command center 190 may be used by senior officials in charge of making decisions over emergency monitoring, control, response, and evaluation. The command center 190 may also be used by any system connected to applications or services used by commanders/supervisors 180. The command center 190 may include a system configuration component 190A that enables the configuration of the automation system 130 and its components, functionality, and parameters.

In some embodiments, the automation system 130 may be connected with different types of first responders 160 such as fire responders 161, security officers 162, police 163, or health service providers 164. The first responders 160 may be either humans or assets. For example, a tire truck may be considered as a first responder. In some embodiments, both human and selected physical assets may be considered as first responders 160.

Mobile PCs 165 may be provided to all or selected first responders 160. The mobile PCs 165 may be but not limited to mobile phones, smart phones, portable digital assistants (PDAs), smart glasses, wearable devices, etc. In some embodiments, at least some of the mobile PCs 165 may include location and motion sensors 166, digital screen 167, and communication components 168. In some embodiments, the sensors 120, the automation system 130, the command center 190, and the mobile PCs 160 may be connected via a local area network, or the Internet, or any other networking methods. The communication channels within the system 100 may be encrypted to preserve confidential information. In addition to the commanders or supervisors 180 and the first responders 160, the general public 170 may also be connected with the automation system 130 via mobile PCs 172 or public digital signage systems 171 by utilizing the aforementioned network infrastructure.

The automation system 130 may include two main logical or physical sub units for emergency identification component 140 and automated emergency response component 150. For supporting overall integration of emergency identification component 140 and emergency response component 150, the automation system 130 may include a database system 131 that supports storing data, information, metadata, or the like arisen out of any component of the system 100. Moreover, the automation system 130 may include a geographical information system 132 to manipulate geography related data such as coordinates, routes, maps, traffic and obstacle information, and so on. The geographical information system 132 may be connected with any other component of the automation system 130, the command center 190, the first responders 160 and their mobile PCs 165, and the public 170. In some embodiments, the automation system 130 may be operated using cloud computing.

The automation system 130 may receive a plurality of data streams provided through the multi-modal sensors 120. The sensors 120 may include a set of video sensors 121 such as closed circuit television cameras, Internet Protocol (IP) cameras, or the like. The video sensors 121 may gather series of video frames generated from each sensor in real-time and send to the sensor data receiver 141 of the automation system 130. In some embodiments, pre-recorded video files or images/photos may be sent to the sensor data receiver 141. Moreover, the sensor 120 may include other modality sensors such as audio sensors 122, text sensors 123 that may provide textual input via another device such as mobile phone, mobile app, or event from third party services such as social networks or the like. In some embodiments, both text and images may be sent together to the sensor data receiver 141 via mobile devices or third party services such as social networks. The sensors 120 may include IoT sensors 124. The sensor data receiver 141 may be connected to various kinds of IoT sensors 124 or systems that provide data in real-time or in periodic fashion. Such IoT sensors 124 may include but not limited to weather sensors, traffic sensors, building control and so on. Further, the sensors 120 described herein include not only physical sensor devices but also external services that provide some data, information, or insights regarding the surveillance area of interest 110. In addition to sensors 120, mobile PCs 165 data (provided to the first responders 160) such as mobile video data (either in real-time video streams or video files or photos), location and motion sensors 166 data, and other related data from mobile PCs 165 may be received by the sensor data receiver 141.

In some embodiments, the first responders 160 may be equipped with additional sensors or devices such as smart glass, head mounted displays, speed sensors, or any other related sensors devices to carry out their operations. In such embodiments, those sensors data such as smart glass camera, location or speed, orientation data may also be received by the sensor data receiver 141. For example, the automation system 130 may keep storing location data of each first responders 160 provided by the mobile PCs 165. The stored location data may be used when dispatching take place in presence of an emergency.

The sensor data receiver 141 may either receive data in real-time through streaming or request data periodically from an external/third party system/service or sensors. The sensor data receiver 141 may further extract, transform, and load data from varieties of sensors, data sources to feed into primitive features extraction component 142. Moreover, the sensor data receiver 141 may consist or be integrated with some of the sensors related data receiving systems such as video management systems, streaming engines, or the like.

The sensor data receiver 141 may also receive or analyze metadata in addition to receiving raw data. Raw data is information provided by the sensors 120, while metadata is data that provides information about raw data. For example, metadata such as image resolution, video frame rate, encoding information, and the like may be derived from or provided by video data origin from the video sensors 121. In some other examples, metadata such as mobile phone numbers, usernames, locations, IP addresses, or the like may also be received or derived by the sensor data receiver 141. In addition to sensor data itself, the sensor data receiver 141 may also keep deriving network information such as channel bandwidth, sensors availability, data speed and so on. Moreover, the sensor data receiver 141 may assign unique identifier to each sensor, a sensor data unit receive at a point of time, or even for a part of a sensor data unit. For example, the sensor data receiver 141 may give a unique identifier automatically to each video surveillance camera, each video frame, and multiple regions of interest inside a particular video frame. Such metadata, e.g., identifiers provided to sensors, sensor data units, or sub-units of a particular sensor data unit such as a video frame, may be stored in the database 131, so that they may be used in other components or processes of the system 100. In some embodiments, raw data may be stored in a dedicated set of storages and meta-data may be stored in the database 131. In some embodiments, only a certain set of raw data such as video sensors data 121 and audio sensors data 122 may be stored in a dedicated storage while metadata related to video sensors data 121, audio sensors data 122, and all raw data and metadata of other sensors may be stored in the database 131. Based on the data and metadata storing method, the sensor data receiver 141 may also able to retrieve any particular set of data units, particular data unit, or sub-data units of a particular data unit from storage and/or the database 131 based on the metadata provided. For example, once video sensor identifier and frame identifier, and particular region's polygon data is provided. actual sensor data unit may be retrieved by the sensor data receiver 141. Such retrieval of sensor data may be repeatedly used in subsequent process or components of the system 100. In some embodiments, the database 131 may be a distributed database system. In some embodiments, the database 131 may include one or more of a relational database, a hierarchical database, a network database, an object-oriented database, or a database of any other type.

The sensor data receiver 141 may feed data, metadata, or any other sort of information collected via the plurality of sensors 120 to a primitive features extraction component 142. The primitive features extraction component 142 may extract features, information, representations, structures, anomalies, objects and their behaviors, or similar primitive derivatives from data received via the sensor data receiver 141. Such primitive features extracted may be stored in the database 131. In some embodiment, the primitive features extraction component 142 may be executed in a distributed computing environment. The number of computational units in the distributed computing environment may be adjusted based on the amount of sensor data to be analyzed.

The primitive features extracted may be matches with a set of rules stored in a rules storage 144 to identify emergency situations. For example, the primitive features extraction component 142 may detect faces from the video sensors data 121, and if there is rule in the rules storage 144 for a particular person X, the rules engine 143 may search for the person X's face in all faces extracted by the primitive features extraction component 142. If a matching face is found in faces extracted by the primitive features extraction component 142, the rules engine 143 may notify subsequent process of the automation system 130 of the emergency detection.

For example, once a suspicious person X's face is recognized by the rules engine 143, the rules engine 143 may generate emergency details 145. For example, information such as name, last seen location and time, gender, etc. may be included in the emergency details 145. Furthermore, the emergency details 145 may include raw data received from sensors such as image of suspicious person X's face based on time, sensor ID, or face region data extracted by the primitive features extraction component 141. Once an emergency is triggered by the rules engine 143, related information may be aggregated to form the emergency details 145 and the emergency response component 150 may be initiated.

The emergency response component 150 may initiate the automated response once an emergency is triggered via the rules engine 143 with the emergency details 145. The automated response may include notifying the first responders 160 and dispatching a selected set of the first responders 160 to handle a particular emergency situation. Moreover, the emergency response component 150 may provide situation information to the commanders/supervisors 180 via the command center 190, and may also alert the public 170 in certain situations via digital signage 171, the hand held mobile PCs 172, or any other alarm systems. Furthermore, the emergency response component 150 may control the sensors 120 or deploy new sensors such as drones depending on the severity of the emergency situation. In addition, in some embodiments, the commanders/supervisors 180 may be allowed to manually intervene at any point of time to control the dispatching, alerting, alarming, sensors, or any related matter.

In some embodiments, the emergency response component 150 may automatically determine a priority for an emergency situation based on the received emergency details 145 and policy engine 151. In some embodiments, the priority of an emergency may be decided manually based on a manual input or a rule (e.g., stored in the rules storage 144) defined by the commanders/supervisors 180 or the first responders 160. Based on the priority and the type of emergency, the number of first responders that should be allocated from each type of first responders may be determined by dispatching component 153. Furthermore, the dispatching component 153 may select individual first responders to engage based on specified polices in the policy engine 151. Once the decision is made on the number of first responders required from each responder type, and the individual first responders to engage, notifications may be sent to all or a selected group of first responders based on policies defined in the policy engine 151. Notifications may be sent via commands and notifications component 154. For example, the notification of an emergency may be sent to the first responders 160 via the mobile PCs 165 provided to the first responders 160. The notification may be displayed on mobile PCs 165's digital screen with geographical information such as map, location, direction, etc. Moreover, the notification may include multimedia details of the emergency. For example, if a suspicious person is detected, such persons' face image extracted by the primitive features extraction component 142 may be included in the emergency details 145. Thus, the face image may be sent to the Mobile PCs 165 for the first responders 160 to see the actual raw sensor data received from the sensors 120 to make the situation awareness more effective. For the individual first responders dispatched to engage in a particular emergency situation by the dispatching component 153, a special notification called "command" may be sent. The command may indicate that the receiving first responder should respond or engage in mitigating the emergency response highlighted or indicated in the command. When a command notification is sent by the commands and notifications component 154 to a set of first responders 160, the commands and notifications component 154 may also send other necessary information for responding the emergency situation. For example, a command notification may include, but not limited to, navigation information (such as route, time to reach the emergency location, traffic conditions), other first responders engage in the same emergency situation, and the locations of fellow first responders. Details of selected first responders to engage in a particular emergency situation, their metadata such as location received via the mobile PC 165 provided to them, or video sensor data of the mobile PC 165 may be stored in the database 131 or a similar storage.

Once an emergency situation is identified and the command notifications are sent to selected individuals via the commands and notifications component 154. The individual first responders who receive the command notifications may be forced to acknowledge the command. When an individual first responder accept the command or reject the command, the command center 190 or the monitoring and control component 190B may be notified. In some embodiments, if a particular first responder rejects the command to engage in a particular emergency situation, the dispatching component 153 may choose another first responder of the same type and send the command notifications to the newly selected first responder via the commands and notifications component 154.

While a particular emergency situation is identified in real-time and the emergency response component 150 is responding automatically, the command center 190 may observe the situation in real-time. For example, the rule engine 143, or the commands and notifications component 154 may alert the command center 190 about the emergency situation with the derived emergency details 145. The commanders or supervisors 180 may refer to the emergency details 145 in real-time with geographical details such as map, location, direction, speed, etc. Moreover, while the emergency response component 150 is responding to the emergency situation, the commanders or supervisors 180 may observe the locations of all the first responders, the locations of selected individual first responders and corresponding details of the selected individual first responders (e.g., name, type, etc.), whether the selected individual first responders accept the command notification or not. Once a particular first responder 160 accepts the command notification and moves towards the emergency situation location (which can be static or dynamic), the commanders or supervisors 180 may observe the real-time location of the first responders with geographical information. Furthermore, the command center 190 may enable communication between the commanders 180 and the first responders 160 via the command center 190 and the first responders' mobile PCs 165.

An emergency notification may be discarded upon the first responders' confirmation via the mobile PCs 165 or automatically by the automation system 130 once at least a portion of the dispatched first responders reached the location of the emergency situation. These configurations may be further defined in the policy engine 151. The locations of the first responders' mobile PCs 165 and public's mobile PCs 172 may be received via the sensor data receiver 141 and stored in the database 131. The metadata stored and updated in real-time may be further used by the command center 190 to view first responders' locations at any time, and check or evaluate the movement history of first responders. The locations of the public mobile PCs 172 may be either stored or not stored in the database 131 based on the configuration of the system 100.

According to various embodiments, the command center 190 may include a system configuration component 190A. The system configuration component 190A may need to set up the sensors 120, the first responders 160, the automation system 130, or any other components of the system 100 prior to the starting of the emergency identification and response operations.

Figure 2:
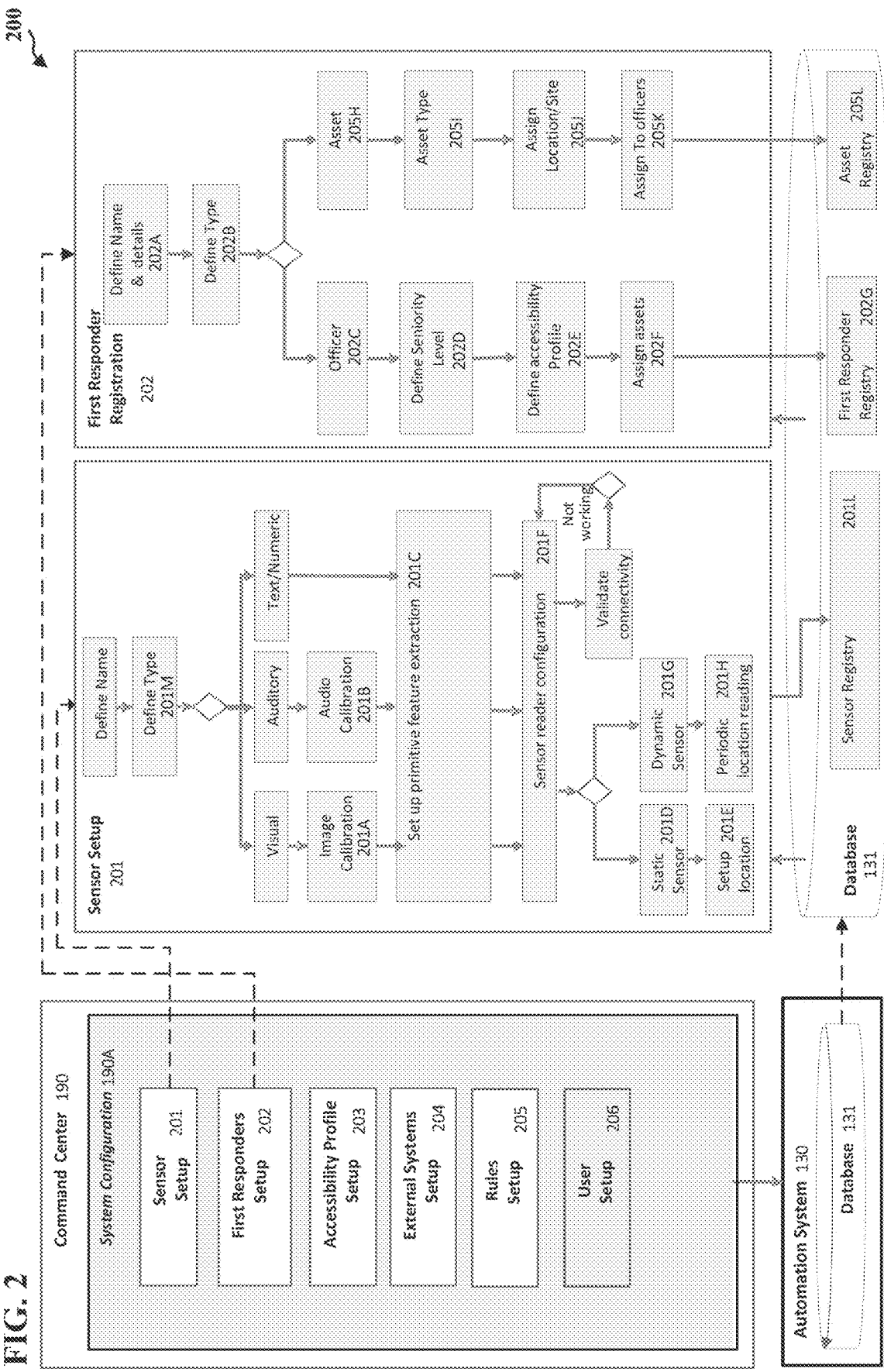
FIG. 2 is a diagram illustrating an example of the system configuration component.

FIG. 2 is a diagram 200 illustrating an example of the system configuration component 190A. The system configuration component 190A may include a sensor setup component 201 and a first responder registration component 202. The system configuration component 190A may include any other configuration components necessary according to various embodiments.

The system configuration component 190A may set up the sensors of the system prior to initiating the automation system 130. For example, the plurality of sensors 120 may be set up by the commanders or supervisors 180 or any other officers. For example, the sensor setup component 201 may define the name and the types 201M of the sensors. The sensor types 201M may be loaded from a pre-defined set of sensor types stored in the database 131. For example and in one embodiment, the sensor types 201M may be defined based on the type of data sensors provide, such as visual, auditory, textual, or numerical. In one embodiment, the sensor types 201M may be define based on the category of sensors, such as closed-circuit television (CCTV), mobile, IP camera, Short Message Service (SMS), Rich Site Summary (RSS) feeds, and social networking service (SNS), etc. In some embodiments, the sensor types 201M may be defined according to a combination or a hierarchy defined based on the type of data a sensor provides and the category of the sensor. For some types of sensors, a calibration process may be used in the primitive features extraction component 142 in the automation system 130. For example, if a camera sensor provides visual data, the calibration of the camera sensor may be needed to estimate real-world geography from the image 2D coordinates. Therefore, the command center 190 may provide an interface for image calibration. Likewise, calibration may be needed based on the sensor type or the category of the sensor. For example, audio sensors may need to go through audio sensor calibration 201B, which may be different from image calibration 201A.

Data obtained by the plurality of sensors 120 may be analyzed by the primitive features extraction component 142. Thus, the sensor setup component 201 may need to define or enable/disable sensor specific configuration for the primitive features extraction component 142. For example, there may be a default configuration for the primitive features extraction component 142 based on the data a particular sensor provides. For example, for visual sensors, there may be a default primitive sensors extraction configuration to detect objects, humans from videos. On the other hand, audio sensors may be configured to extract a different set of primitive features such as conducting automatic speech recognition, extracting keywords, and creating ontology and so on. However, primitive features setup component 201C may enable or disable certain set of primitive detection and may also define a particular sensor order to extract primitive features in the primitive features extraction component 142. For example, certain video camera sensor directed to detect license plates on a certain road does not need to detect human. In such a case, the primitive features extraction component 142 may be altered based on sensor specific needs.

In some embodiments, each sensor may be either static or dynamic. In such embodiments, the sensor setup component 201 may need to define the location of static sensors. Moreover, the sensor setup component 201 may enable or disable reading location data from the dynamic sensors that are moving and equipped with location sensors. For example, both the mobile PCs 165 provided to the first responders 160 and the mobile PCs 172 provided to the public may include location sensors to retrieve the location of the first responders or the location of a particular person of the public. The sensor setup component 201 may be configured to read location periodically (at 201H) for the first responders' mobile PCs 165 while not allowing to do so for the public mobile PCs 172 due to a data protection policy of various embodiments. There may be some sensors that are not physical sensors but external services that feed data to the sensor data receiver 141 with embedded location metadata. For example, there may be a sensor or a service that provides metadata about network IP address or locations of assets or humans and so on. In such cases, the sensor setup component 201 may enable or disable the storing of the location metadata. Furthermore, in some embodiments, the sensor setup component 201 may enable or disable predicable location data reading based on sensor type, or for all the sensors of a particular type such as public mobile PCs 172 based on the needs of the system 100. Once a particular sensor or sensor type is set up via the sensor setup component 210, the sensor may be registered in the sensor registry 201L, which may be in the database 131. Furthermore, the sensor setup component 201 may need to define a sensor reader configurations 201F, which may include network properties of a sensor IP address, protocol and so on, sensors intrinsic metadata such as encoding type, resolution, and so on. Once the sensor reader configuration 201F is defined, the connectivity to the particular sensor may be tested and the sensor reader configuration 201F may be reconfigured if needed. Furthermore, a setup of a particular sensor or sensor types may be modified or updated at any time by a relevant authority using the sensor setup component 201.

The system configuration module 190A in the command center 190 may register the first responders by utilizing a first responder registration component 202. For example, individual first responders 160 of different types of first responders such as fire responders 161, security 162, and police 162, and health staff 164 may be registered via the first responder registration component 202. In such registration, commanders, supervisors, or relevant authority may define name, passwords, age, and similar details 202A, with corresponding responder type 202B. First responders 160 may be either officers or assets such as fire vehicles, arms, etc. Assets 205H may be registered via using the first responder registration component 202A or linking an asset inventory to the first responder registration component 202. For an individual asset, based on the type of the asset, a predefined location, site, or station may be allocated by the first responder registration component 202. The location, site or station may be modified manually or automatically.

For first responder officer, there may be an accessibility profile 202E allocated to control accessibility, information, authorization and functionality based on seniority level of an individual first responder. An accessibility profile setup component 203 may be included in the system configuration component 190A and a plurality of accessibility profiles may be defined using the accessibility profile setup component 203 for different types of first responder officers with different seniority levels. The commanders or supervisors 180 may be registered as first responders who may be assigned an accessibility profile 202E that has wider accessibility to information, functionalities, data or analytics provided by the automation system 130. Moreover, the first responder registration component 202 may assign resources or assets to officers (at 205K) or may assign officers to assets (at 202F). Furthermore, the first responder registration component 202 may store registration details in a first responder registry 202G (for officers) and in an asset registry 205L (for assets), both of which may be defined in the database system 131. In some embodiments, both assets and officers data may be merged and stored in one unit of the database 131.

The items in the first responder registry 202G and the asset registry 205L may be updated or modified at any time by using user interface associated with the first responder registration component 202 in the command center 190 or by an external system connected to the first responder registration component 202. For example, an external system or a component in the automation system 130 that assigns or schedules assets to the first responders based on work shifts may automatically modify the first responder registry 202G and/or the asset registry 205L via a first responder registration service. In some embodiments, the interface or service of the first responder registration component 202 may allow the first responders 160 to register themselves and/or assets by using the command center 190, or mobile PCs 165 connected with the first responder registration component 202. Furthermore, the first responders may be allowed to update the first responder registry 202G and the asset registry 205L in real-time at any time based on personal detail changes, asset changes, or assignments, or similar situations.

According to various embodiments, the command center 190, its sub modules such as system configuration component 190A and the monitoring and control component 190B, may provide a service that can be connected to external systems or may provide both a service and a graphical user interface (GUI) application with interfaces to perform operations of the system configuration component 190A and the monitoring and control component 190B. The system configuration component 190A and the monitoring and control component 190B may be operated manually by human operators or automatically by external systems connected to the system configuration component 190A and the monitoring and control component 190B. Furthermore, submodules of the system configuration component 190A and the command center 190 may be operated manually by human operators or automatically by external systems. In some embodiments, an external system may receive information obtained by the monitoring and control component 190B, thus allowing the external system to modify or control the system 100. According to various embodiments, the automation system 130 or the command center 190 may provide a service to external systems to allow external systems to add, edit, view, delete, or retrieve data from the database 131.

Figure 3:
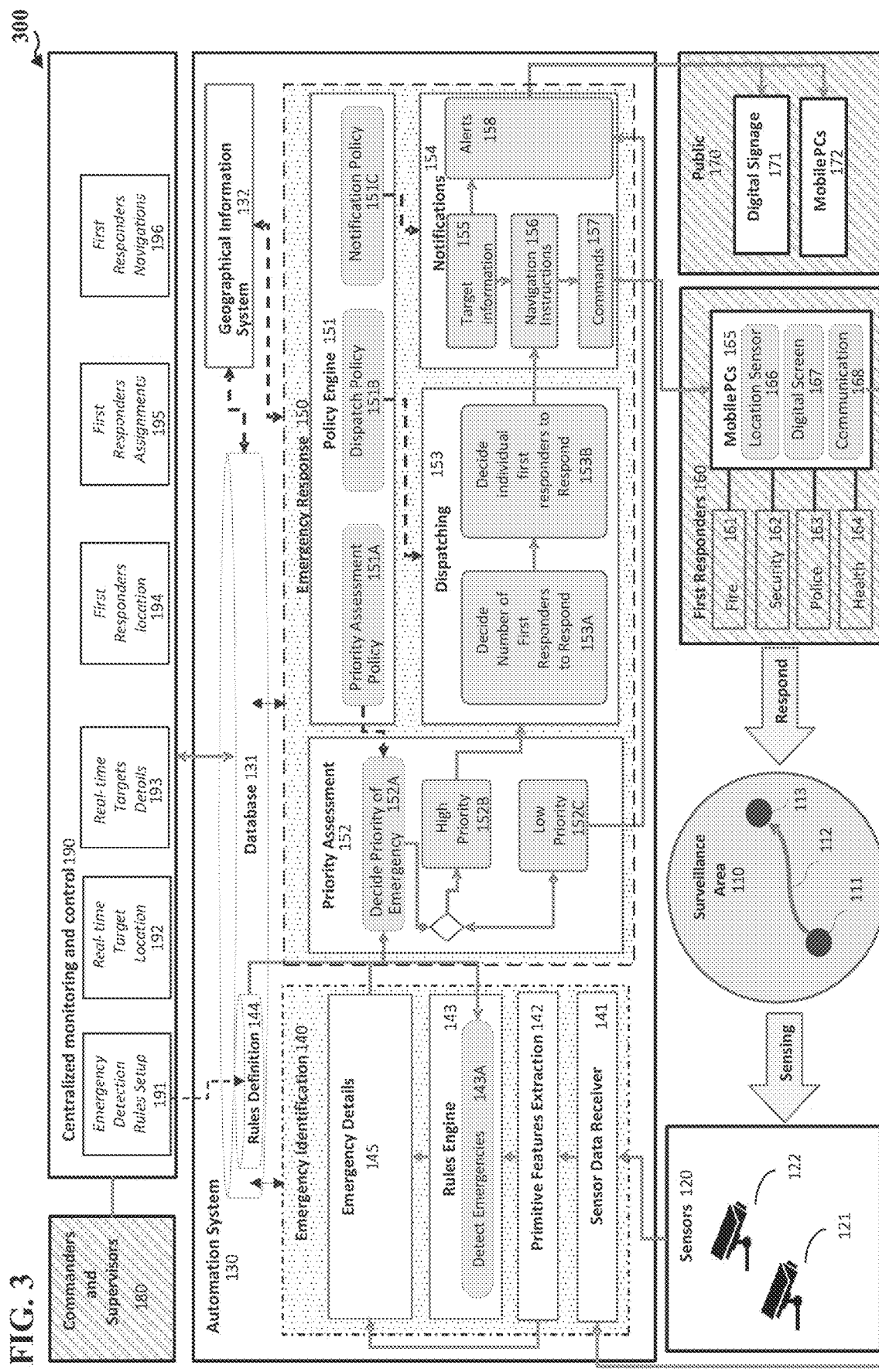
FIG. 3 shows a simplified system and flow diagram illustrating an example process of the automation of the emergency identification and emergency response.

FIG. 3 shows a simplified system and flow diagram 300 illustrating an example process of the automation of the emergency identification and emergency response. In some embodiments, the surveillance area 110 may be observed with a plurality of sensors 120, a plurality of first responders 160, a plurality of commanders 180, and the automation system 130. In one embodiment, a suspicious vehicle or human (herein referred to as an object or an event of interest) who can be a threat to national security appears at a certain location 111 at time=t1 and move to another location at time=t2 through a path/trajectory 112.

In some embodiments, a plurality of sensors such as video sensors 121 (e.g., CCTV cameras) may be deployed across the surveillance area 110. In such embodiments, locations 111 and 113 may be under the coverage by such video sensors 121 and 122 collecting a series of images on the particular locations 121 and 122. Furthermore, the continuous data or metadata streams provided by the sensors 120 may be received or read by the sensor data receiver 141 over computer networks.

Once the sensor data receiver 141 receives images from the sensors 120, the data may be stored in the database 131 indicating sensor ID, time, data unit IDs such as video frame IDs. The sensor IDs, emergency identifications, or primitive features that should be extracted from each sensor may be defined by the sensor setup component 201 (e.g., the primitive features setup component 201C) by commander or first responder or any other operator. Once the data collected by the sensors 120 is received by the sensor data receiver 141, the primitive features extraction component 142 may further analyze these data for detection, identifying, tracking, analyzing objects or events of interests such as the object or event appeared in location 111 or 113.

The primitive features extraction component 142 may conduct primitive computational analysis tasks that lead to detect, identify, analyze objects, events or their properties such as motions, behaviors, or even derived information such as location of origin. These primitive features extracted may further allow the automation system 130 to detect or identify certain secondary or territory or more abstract properties, behaviors, criteria of various objects or events as configured by the sensor setup component 201. These extracted primitive features may include categorical or non-categorical indexes, numerical data, textual or any other multimedia formats, or may even result in complex data structures such as trees, graphs and so on. Furthermore, these extracted primitive features of different formats may be stored in the database 131 for further usage in emergency response, investigations, or performance evaluations and so on.

Figure 4:
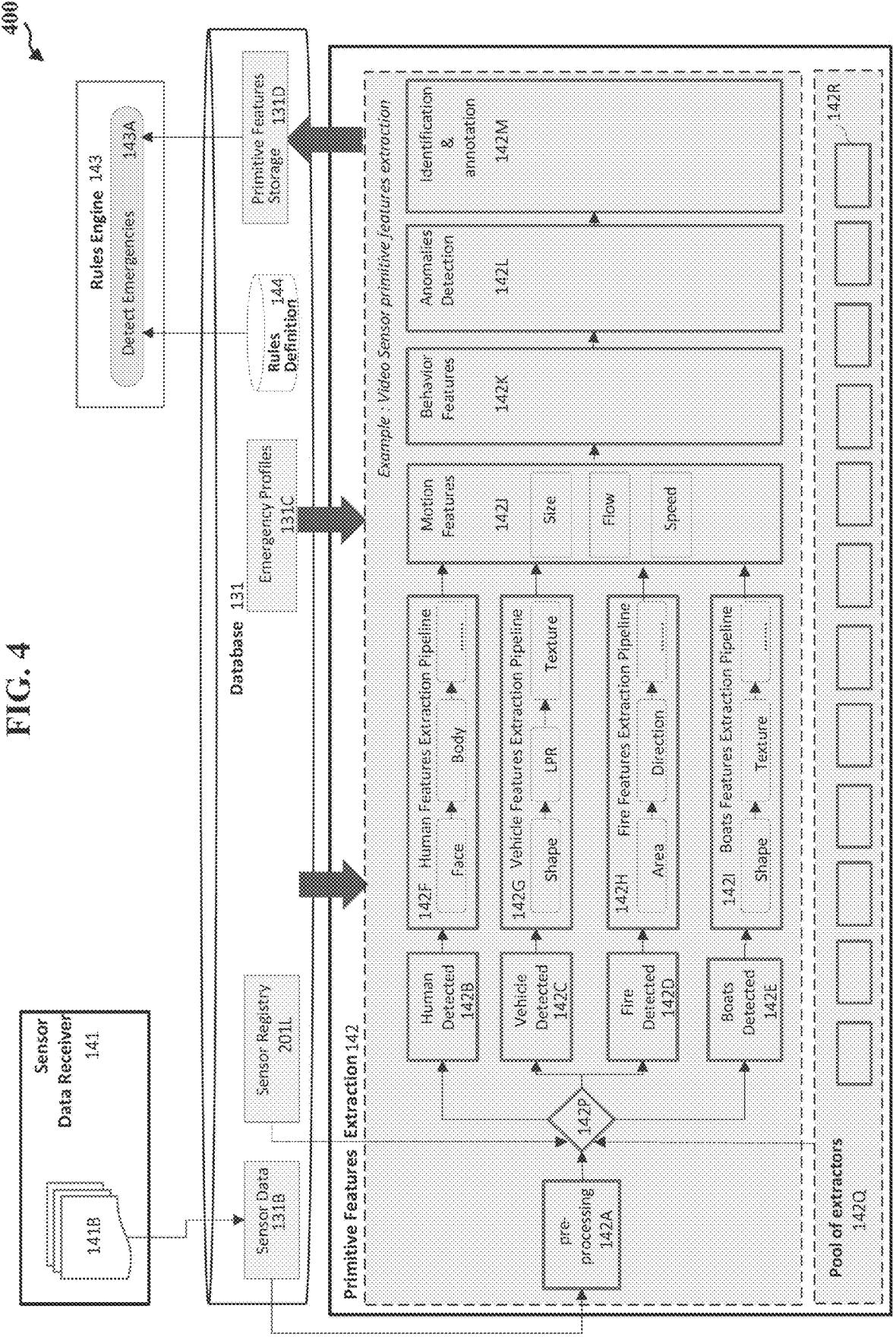
FIG. 4 is a diagram illustrating an example of primitive features extraction for a video sensor.

FIG. 4 is a diagram 400 illustrating an example of primitive features extraction for a video sensor. For example, at t=t1 at location 111 in FIG. 3, data of the sensor 121, which may be a series of video frames 141B, is received or read by the sensor data receiver 141, and the data may be stored in sensor data storage 131B in the database 131 in real-time (or near-real time). At the same time, the primitive features extraction component 142 may read the video frames 141B for extracting primitive features. The primitive features extraction component 142 may be specific for the video sensor (CCTV) 121 or specific for all video sensors. Prior to starting to extract primitive features, the primitive features extraction component 142 may conduct pre-processing operations such as noise reduction/elimination, extract-transform-load, reduce resolution/frame rate, and so on. Data modality may be analyzed during pre-processing. According to various embodiments, after the video frames 141B is processed by the pre-processing component 142A, the primitive features extraction component 142 may conduct a series of extractions as defined in the sensor registry 201L by the sensor setup component 201. For example, the sensor setup component 201 may have allowed video sensors 121 and 122 to detect objects or events such as humans 142B, vehicles 142C, fire 142D, boats 142E, and conduct further primitive feature extractions as illustrated from 142F to 142M.

For example and in one embodiment, if a human is detected, the human features extraction pipeline 142F may be executed by the primitive features extraction component 142 based on computation algorithms to analyze image or videos to detect or extract faces, body, outfits, eye, color, gender, etc. During each extraction phase of the primitive features extraction component 142, all or part of details of extracted primitives may be updated in the database 131 under primitive features storage 131D with respect to the sensor, data unit, or sub-data unit indices stored in the sensor registry 201L and sensor data 131B received from the sensor data receiver 141. Furthermore, primitive features extracted and stored in the primitive features storage 131D may be in various formats such as text, numeric, vectors, trees, graphs and so on. For example, once human detection 142B is completed, it may result in a face region of a particular video frame. In such a case, face region polygon, face specific features such as textures, proportionate distance between eyes or the like, face region image like multi-modal and multi-format data may be stored in the primitive features storage 131D. In one embodiment, primitive features extraction may extract various spatial and temporal information related to objects, events or the like, which may further be used in emergency identification.

Moreover, if the sensors 121 has been set up to detect vehicles 142C and extract other primitives such as vehicle shape, license plate number (LPR), type, and may store the extracted primitives in the primitive features database 131D.

Further, there may be common primitive extractions for all objects or all events such as motion features 142J, behavior features 142K, anomalies 142L or the like. In such cases, for objects such as vehicles, humans, boats, there may be a common extraction of primitive motion features 142J. The motion features 142J may include size, speed, flow or the like primitive features extracted based on the sensor registry 201L and stored data specific to a particular sensor. For example, size and speed estimation during extraction of motion features 142J may make use of sensor location and image calibration 201A data of a particular sensor specified in the sensor registry 201L. Furthermore, the motion features 142J may track an object or an event over a sequence of data units or sub data units to obtain a flow of object of the vehicle of interest. In some embodiments, there may be specific motion features 142J, behavior features 142K, anomalies 142L, or the like depending on the type or category of an object or an event. There may be primitive feature extractions based on previously extracted primitive features such as object identification and classification 142M. In some embodiments, some or all extraction process may utilize pre-trained computation models for detection, identification, classification, clustering, registering, predicting of objects, events or there primitive features like operations.

There may be one or more extractions in a particular primitive features extraction component 142 that are set up specified for a particular sensor or sensor type. Furthermore, the primitive features extraction component 142 may assemble pipeline or order of extractions for a particular sensor or sensory type bases on a pool of extractors 142Q which are pre-trained, or pre-prepared computational models which can perform various extractions according to various embodiments. These extractors may be added or modified based on emergency identification requirements with a set of pre-defined standard interfaces to be applied in the primitive features extraction component 142. In some embodiments, some of the elements in the pool of extractors 142Q may make use of external extracting services, where a particular data element/unit is sent to an external service to perform the primitive feature extractions.

While primitive features extraction is happening in parallel, the rules engine 143 may mine the primitive features storage 131D to identify matching rules for emergencies of interested. For example, a plurality of definitions of rules for emergency identification may be stored in the rules storage 144 in the database 131. A sub component 143A within the rules engine 143 may keep checking a plurality of primitives that are matched with one or more of the rules stored in the rules storage 144. If a matching result is found, the rule may be trigger to detect an emergency situation.

In some embodiments, the primitive features extraction component 142 may have a similar configuration described above to extract semantic, sentiment or the like features from text based data/sensors or external services such as social media, web search engines, automated speed recognition data, etc. Moreover, the primitive features extraction component 142 may include features from multimedia contents such as video, audio, text, HTML pages (web pages), and so on.

Figure 5:
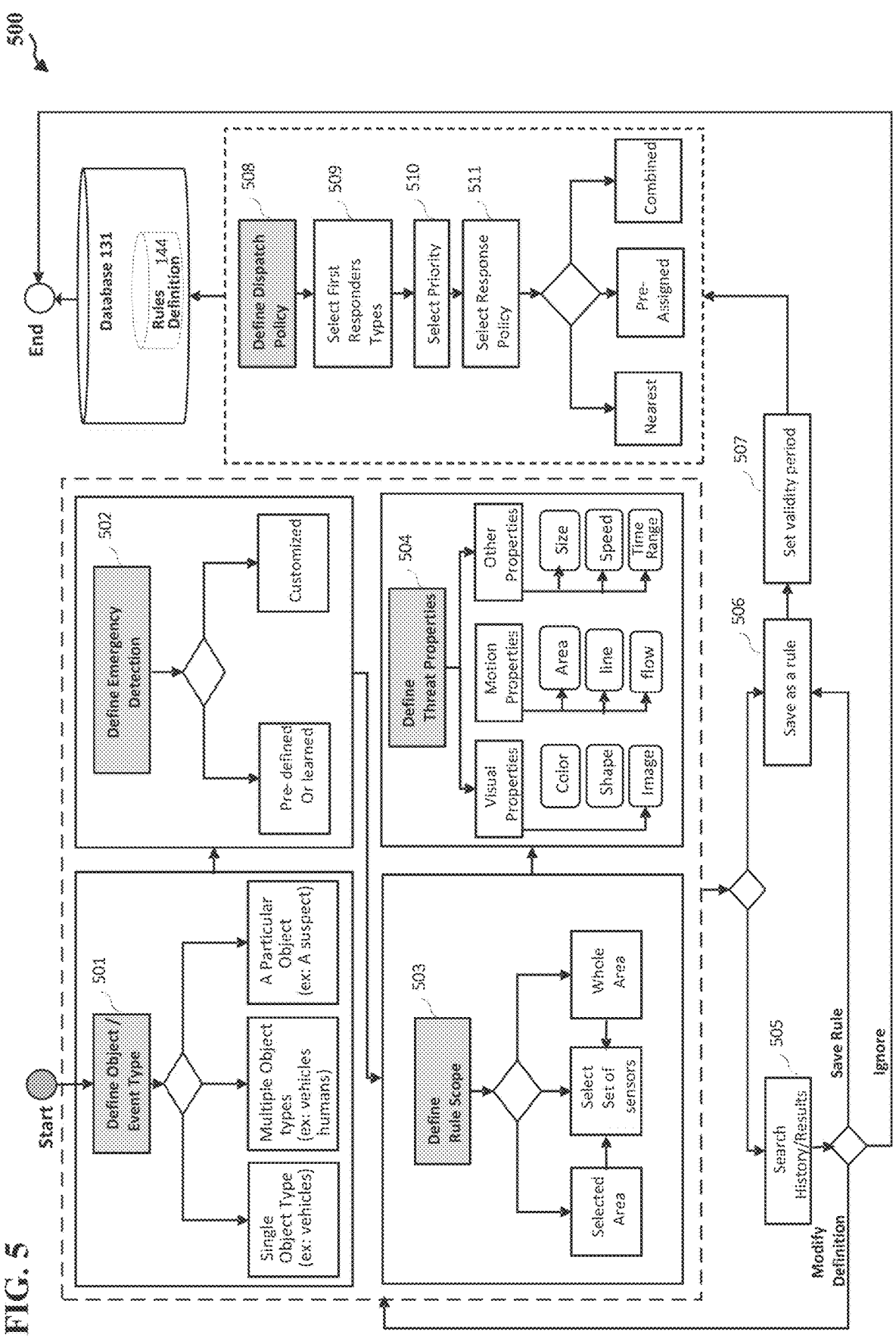
FIG. 5 is a simplified flow diagram of defining a rule in the rules engine via the command center emergency detection rules setup component.

In some embodiments, the automation system 130 may allow modify (add/edit/delete) rules definitions in real-time/ dynamically and interactively via command center 190 GUI application or services. In other words, the rules engine 143 may accept modification of rules at any time while the rules engine 143 is in operation. FIG. 5 is a simplified flow diagram 500 of defining a rule in the rules engine 143 via the command center emergency detection rules setup component 191.

For example, the rules engine 143 may define (at 501) a particular object type or event type (e.g., vehicle, human, etc.) that a particular emergency is related to. Moreover, the rules engine 143 may define a specific type of object such as blue sedan with license plate number 12348. Once the object/event type is defined at 501, the rules engine 143 may define a category of emergency or detection, e.g., entering restricted area, or over speeding vehicle, and so on. Such detections may be further defined in the sensor setup component 201.

In some embodiments, the rules engine 143 may define (at 502) the scope of rule, which can be either an area defines by GPS coordinates and any other coordinates system or by selecting a set of sensors (e.g., selecting a few traffic cameras). The scope may be further defined by a particular time range during which the defined rule may be applied. Furthermore, there may be specific properties to be defined based on the data that a particular sensor provides. For example, an intrusion detection rule that is defined for a certain camera sensor may require to highlight sensitive area, or line that is subjected to intrusion detection. The rules engine 143 may further define such properties such as color, shapes, flows, trajectories, sizes, speeds, keywords, etc. based on individual emergency detection category.

In some embodiments, the commander/operators or first responder who define these parameters may search (at 505) for past or historical results based on the same definition in the database 131 or may save the definition as a rule in database 131 under the rules storage 144. If the definition of an emergency is saved as a rule for identifying the emergency, policies may need to be defined (at 508) for providing automatic response once such emergency is detected via the rules engine 143. In some embodiments, the quantities from individual first responder types that are minimally required to engage in such emergency may be defined at 509. Moreover, the priority (e.g., critical, mid, or low, etc.) of the emergency may be defined (at 510) manually based on the rule. In some embodiments, the priority may be decided automatically.

In some embodiments, in order to decide individual officers who are to be engaged in a particular emergency, response policy may be selected at 511. For example, the response policy may include assigning the nearest n security officers to a certain emergency detected by the rules engine 143. In some embodiments, first responders may be pre-assigned to certain regions based on emergency situation predictions. In such embodiments, pre-assigned first responders may be assigned to engage in a certain emergency. In some embodiments, the approach of assigning the nearest or fastest first responders may be combined with the approach of pre-assigning first responders.

Figure 6:
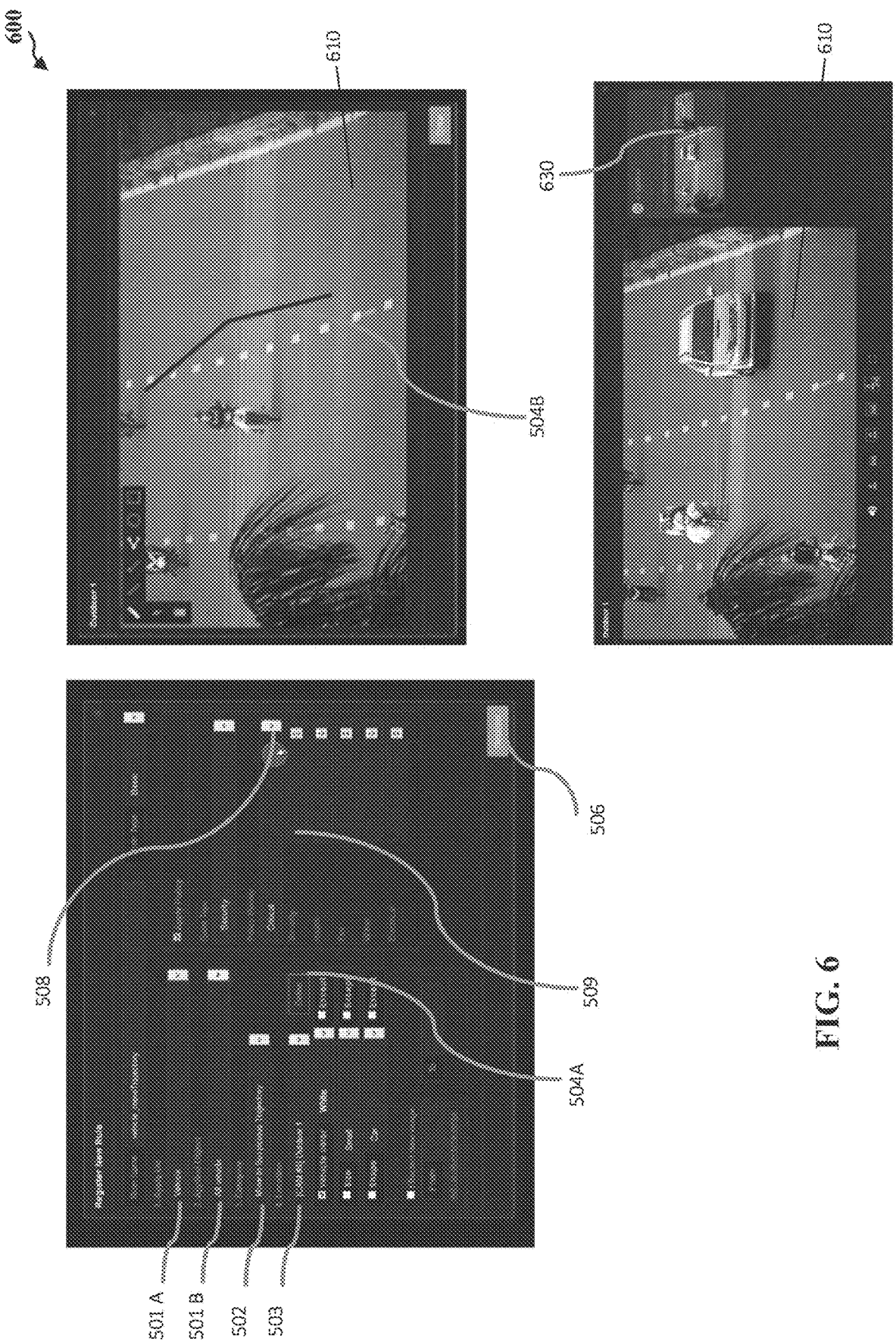
FIG. 6 shows an example GUI by which a rule may be added in real-time and a corresponding emergency may be detected in real-time in accordance with items specified above in FIG. 5.

FIG. 6 shows an example GUI 600 by which a rule may be added in real-time and a corresponding emergency may be detected in real-time in accordance with items specified above in FIG. 5. Once a rule is defined in the rules storage 144, it may be mined and activated by the rules engine 143. Emergency details such as sensor data related to identified emergency (such as image), location, parameters, etc. may be derived from the primitive features storage 131D and may be shown as highlighted in the GUI 600.

For example, a part of rule definition interface 600 may allow defining the flow specified in 500 via a graphical user interface. In such case, object/event type defined at 501 may be selected in the GUI 600. For example, if a commander or first responder or the like wants to identify a suspicious vehicle travelling towards a certain direction or road, object/event type defined at 501 may be selected as "vehicles" in UI item 501A, where the rule will be applied to object category of vehicles detected by the primitive features extraction component 142. Moreover, in aforementioned scenario, if a commander specifies a particular object's (e.g., vehicle in this case) properties or properties that are related to a class of vehicles in UI item 501B, which related to threat/emergency properties defined at 504. Such object class specific features may be defined in synchronization with features extracted by the primitive features extraction component 142. For example, the aforementioned rule definition may be interested in identifying white color (color property), car (shape property) and these features may be specified accordingly by using the GUI 600. In order to identify the aforementioned threat or emergency, the rules engine 143 may define (at 502) a plurality of emergency detections based on primitive features extracted by the primitive feature extraction component 142. For example, by utilizing vehicle detection 142C and motion features 142J, the rules engine 143 may allow to identify over speeding vehicles, flow or trajectory based violations, etc. Therefore, aforementioned example may utilize an emergency detection defined at 502 for identifying objects moving in a suspicious trajectory. Once the object/event type, emergency detection and object properties are specified, the rule definition interface 600 may allow to define rule scope as indicated in UI items 503 and 504A in the GUI 600. A user may define either an area on a map or a plurality of sensors where a particular emergency identification may only be conducted for the selected sensors or the sensors within the area specified in UI item 504A. Furthermore, in order to define emergency or threat properties in real-time and interactively, the rule definition interface 600 may provide highlighting geometries such as lines, areas, directions on a real-time sensor data viewer 610 as indicated in 504B. For example, commander or first responder or the like may specify the suspicious trajectory in aforementioned example by defining trajectory with polygon or line 504B on real-time video feed. The rules engine 143 recognizes a trajectory depicted on the real-time video feed as one of rules for detecting an object moving on the real-time video feed. In other examples, the real-time sensor data viewer 610 may show objects detected by the primitive features extraction component 142 and may directly select objects of interest such as humans, vehicles or the like that are suspicious, or potential threats that may be high priority emergency and require to be responded.

Once rules definition is provided, it can be saved, registered in the rules storage 144 via the graphical user interface 600, where the rules engine may immediately start for identifying emergencies based on specified properties, criteria in a given rule definition. For example, the rules engine may keep mining the primitive features storage 131D with respect to rules definitions stored in the rules storage 144 via the detect emergencies component 143A. As soon as a matching emergency is identified, the subsequent processes such as priority assessment component 152, dispatching component 153, and notification component 154 may be automatically started. For example, a commander or first responder may keep monitoring the real-time data viewer 610 and if an emergency is identified according to a rule defined. Alternatively, the identified emergency may be displayed in real-time, as shown in 630. In aforementioned rule definition, for example, where a white car requires to be identified in a certain location and travelling towards a certain trajectory/direction, an alert may be provided via emergency details as shown in 630 with object of interest/emergency and related details such as location, time, actual image or sensor data and so on.

Any rule definition specified in the rules storage 144 may be updated via the graphical user interface 600 or an external system without requiring to restart the automated surveillance system 100 or any other subcomponent. Furthermore, any new rules definition may be added into the rules storage 144 without requiring to restart the automated surveillance system 100 or any other subcomponent. Detect emergencies component 143A in rules engine will keep mining the primitive features storage 131D with respect to available rules in the rules storage 144. Therefore, adding, editing, or modifying new rule definitions may only require updating the rules storage 144 in the database 131. As a result, adding, modifying, or deleting rules in real-time and interactively may be possible.

Furthermore, emergency/threat detection types may be added or modified (at 502) in real-time without requiring to restart the automated surveillance system 100 or any other subcomponent. For example, the rules engine may allow to detect new emergencies or modify existing emergency detections such as (intrusion, suspicious objects, high speed, fire, unauthorized access, etc.) by modifying the primitive features extraction component 142. Furthermore, to add new emergency detections, new primitive detectors may be added to the pool of extractors 142Q and may modify the primitive features extraction component 142. In some embodiments, such new emergency detection types added or modified at 502 may be specified in terms of rules based on the features extracted by the rules engine 143, specifically in the detect emergencies component 143A, where emergency identification is conducted by mining the primitive features storage 131D.

Based on emergency details 145 and rule definitions provided and stored in the rule storage 144, the priority of the emergency may be identified based on the rule definition itself where the priority is mentioned or may be derived automatically based on priority assessment policy 151A. In some embodiments, priority may be specified as different levels according to severity of an emergency. Moreover, the priority levels may be specified with categorical labels or numerical levels where absolute value of numerical value proportionate to the severity in priority assessment. In some embodiments, based on the priority level, which is either manually specified or automatically derived, the number of first responders to respond to the emergency may be determined at 153A. The determined number of first responders may receive command notifications 154 that may include target information 155, navigation instructions 156, and other related commands.

For various sensor data being processed or analyzed, the rules storage 144 may include more fields based on features extracted by the primitive features extraction component 142. Such fields may include keywords, ontologies, images, and so on.

Figure 7:
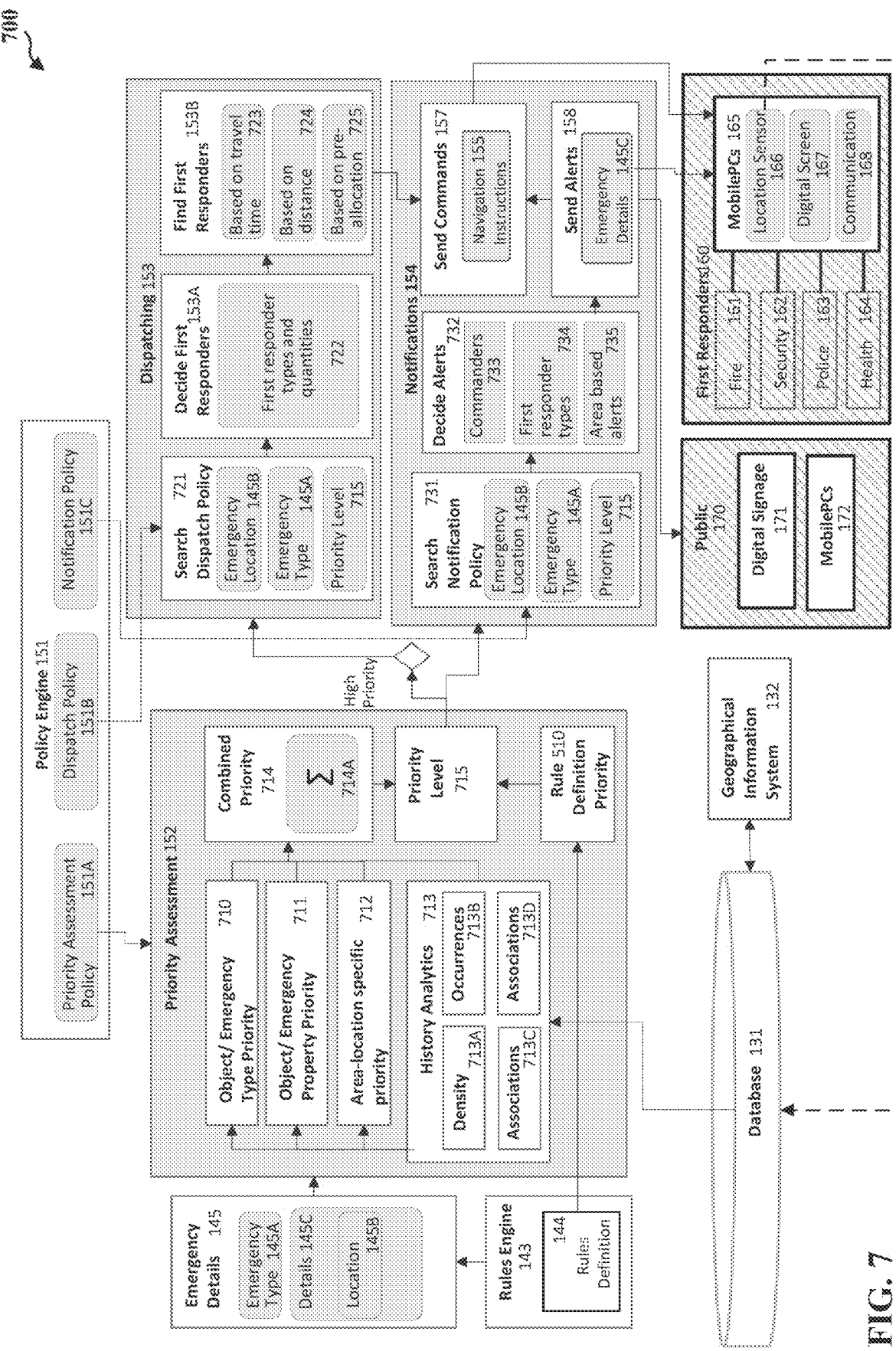
FIG. 7 a simplified diagram illustrating priority assessment, dispatching, and notification in accordance with some embodiments of the disclosure.

FIG. 7 a simplified diagram 700 illustrating priority assessment, dispatching, and notification in accordance with some embodiments of the disclosure. For example, once an emergency situation is identified by the rules engine 143, the emergency details 145 may be extracted by utilizing the primitive features extraction component 142. The emergency details 145 may include emergency type 145A, which may be determined by manually defined rules or may be determined automatically based on pre-trained computational methods. Such emergency type 145A may include, but not limited to, security emergencies, traffic violations, law violations, fire breakouts, water leakages, electricity emergencies, health emergencies, natural disasters, and so on.

Based on the emergency type 145A, details 145C extracted by the primitive features extraction component 142 may be different. For example, if emergency type is a security emergency where a suspect or any identified person of interest is identified via the rules engine 143, the target of interest may be on the move from one location to another location as indicated in FIG. 3, where the target of interest moves from the location 111 to the location 113 over the path/trajectory 112. In such situations, the emergency details 145 may continuously keep tracking the target of interest based on a set of emergency details already extracted (e.g., the image of the target received via sensors (i.e., surveillance cameras)). On the other hand, if the emergency is a fire breakout, the emergency details 145 may not include location changes since the emergency or targeted emergency is not moving but static. Therefore, the primitive features extraction component 142 may extract further details to be included in the emergency details 145 or update the emergency details 145 continuously until the emergency response is provided. Furthermore, the primitive features storage 131D may be queried or the primitive feature extractors from the pool of extractors 142Q may be used for additional details extraction necessary for each emergency type. The extraction of static or dynamic location 145B of an emergency situation is vital as the location may be used to direct the first responders to mitigate risks of a particular emergency situation effectively.

In some embodiments, immediately after an emergency situation is identified via the rules engine 143, the priority assessment component 152 corresponding to the emergency situation may be executed to provide input to the dispatching component 153 and the notifications component 154, which may send notifications based on the priority level 715 of the emergency situation identified. In some embodiments, the priority level 715 may be determined based on priority level defined in the rule stored in the rules storage 144 that leads to the identification of the emergency. In some embodiments, the priority level 715 may be determined automatically based on policy specified in the policy engine 151.

For example, priority levels may be defined in policy engine 151 under priority assessment policy 151A. These priority levels may be either categorical indexes such as high, mid, low, critical, etc. or a numerical scale or a numerical range according to various embodiments. In some embodiments, while a rule is defined by a commander/supervisor in the rules engine 143, the priority level may be specified explicitly. In some embodiments, the priority level may be decided automatically.

When the priority level 715 is decided automatically by the automation system, it may be determined based on a plurality of priorities of different factors that may be indicated in the priority assessment policy 151A. For example, when the priority level 715 is decided or manipulated automatically, it may be determined based on the emergency type's priority level or each object type's priority level 710 specified in the priority assessment policy 151A. For example, a water leakage may be given lower priority than a fire breakout emergency. Furthermore, object type priority levels may be defined as human objects having higher priority than vehicle objects. Furthermore, object properties or emergency properties priorities 711 may be defined. For example, the primitive features extraction component 142 may extract features (e.g., age, gender, race, etc.) of a detected humans and therefore, young children (age range) may be given higher priority than older children. There may be higher priorities for particular genders in some embodiments. Moreover, the primitive features extraction component 142 may extract type, size and speed of vehicles and such properties may be given specified priorities in the priority assessment policy 151A. For example, large or high speed vehicles may be given higher priorities than small or low speed vehicles. Furthermore, the primitive features extraction component 142 may extract fire or smoke features, where high priority may be specified in priority assessment policy 151A for high density or large area fires/smoke. These priority levels defined in the priority assessment policy 151A may include area or location specific priority level definitions. For example, areas that consists of highly valuable properties, critical infrastructures, schools, roads, etc. may be given high priorities.

In some embodiments, the priority levels for certain emergencies, objects or locations/areas may be extracted via the history analytics component 713. For example, the primitive features extraction component 142 may detect a plurality of humans, vehicles from data collected by a plurality of sensors, which may lead to the identification of various analytics such as human, vehicle, or densities, congestion, associations and so on by utilizing the primitive features storage 131D. Furthermore, the emergencies identified via the rules engine 143 may be stored in the database 131, which may lead to the identification of the occurrences of events, emergencies, first responders' behaviors and so on. Therefore, such history analytics may be incorporated in automatically deciding priority level in the priority assessment component 152. For example, the detection results of humans or vehicles or similar objects may result in time period wise density estimation, which may lead to deciding priority level according to the density level or congestion. In such cases, area where human or vehicle densities are high in a particular period of time may be given a higher priority level if the density is above a certain threshold. In another case, if the same person is identified in recent times more frequently, such person of interest or suspect may be given a higher priority. In some example, associations such as a person who often appearing with an identified suspect or terrorist may be given higher priorities in varies emergency situations detected. In another example, if a particular emergency situation took place in a certain area more frequently, such area and emergency situation may be provided with a higher priority level. In some embodiments, history analytics may lead to varying priorities in a given day, week, month or year based on historical analysis of densities, occurrences of events, emergencies, associations, etc.

In some embodiments, priority assessment may use emergency details 145 to derive various categories of priorities specified in the priority assessment policy 151A. For example, emergency type, location or details such as image of a vehicle or suspect, size, motion, etc. may be incorporated to calculate parameters required for automatic priority level estimation together with the history analytics component 713. These priority levels or policies required for automatic priority assessment may be specified by commanders or supervisors or administrators of the automation system, and may be stored in the database 131 or any storage attached to the automation system. Furthermore, commander or supervisors or administrators may change such details as needed from time to time.

Once an emergency identified, if a pre-specified priority level is not specified in the relevant rule that leads to the identification of the emergency, the priority assessment component 152 may calculate a final priority level 715 by combining various priorities specified according to priority assessment policy as mentioned above. The plurality of priorities derived from object or emergency type priority 710, object property or emergency specific priority 711, area-location specific priority 712, and the history analytics based priorities may be aggregated by combined priority component 714 based on a pre-trained computational model or based on a pre-defined algorithm. For example, the combined priority component 714 may perform a linear system of calculations to derive priority level 715. Such linear system may calculate the final priority level 715 by incorporating numerical weights assigned to each priority category. In some embodiments, these weights may be learned from historical responses or simulated responses. Furthermore, there may be situations where these weights are initially specified by commanders, supervisors or administrators and the automation system automatically may learn and update the weights accordingly based on the computational model that is incorporated to manipulate the final priority level 715. In some embodiments, there may be an order of priority precedence specified where either the highest priority of various priorities mentioned in the priority assessment component 152 or some kind of order in these priorities are considered.

If a rule definition in the rules storage 144 that may lead to an emergency situation identification specifies a priority level 715, the priority level 715 may be considered as the final priority and other priorities (e.g., priority level 710, 711, 712) may not be considered. In some embodiments, rule definition may specify an order of priority precedence or which priorities should be considered in which quantities. In such situations, the combined priority component 714 may derive the final priority level 715 accordingly.

In some embodiments, the estimation of the priority level 715 may be the first step in the emergency response component 150. The dispatching component 153 and the notification component 154 may be executed subsequently. Prior to executing the dispatching component 153 to dispatch the first responders, the priority level may be considered. If the priority level is below a specified threshold priority level, the dispatching component 153 may not be executed. For example, if the first responders and their assets are limited, the command centers 190, the public 170 or the first responder 160 may be provided with alerts about the emergency, but the first responders are not provided with commands to engage. In other words, such a situation may result in the execution of the notifications component 154, but not the execution of the dispatching component 153. In some embodiments, the send commands component 157 in the notifications component 154 may not be executed since the dispatching component 153 is not executed.

In some embodiments, if the priority level estimated is higher than a specified priority level threshold, both the dispatching component 153 and the notifications component 154 may be executed. For example, the dispatching component 153 may perform three or more sub-steps. Firstly, the dispatching component 153 may search (at 721) dispatch policy for a particular emergency which is specified in the dispatch policy 151B of the policy engine 151. The dispatch policy 151B may be defined manually or may be trained from simulations or previous historical dispatching results. The dispatching policy 151B may include information regarding the minimal number of first responders required from each type of first responders for different priority levels specified in the priority assessment policy 151A. For example, if the identified emergency is a high priority fire emergency, minimal three fire staffs and minimal two security staffs may be specified. On the other hand, if the identified emergency is a low priority fire emergency, minimal one fire staff and minimal one security staff may be specified. The dispatch policy may include trained computational models or mathematical models that can derive these minimal numbers of ground staff required dynamically based on available resources (e.g., first responders and their assets). Therefore, once the priority level 715 is estimated, the dispatch policy may be searched (at 721) by providing the emergency type 145A, the emergency location 145B, and the priority level 715. The search of dispatch policy at 721 may result in deciding the first responders at 153A, where the number of first responders required and the minimal quantities of different types of first responders required to be engaged in a particular emergency situation is identified based on dispatch policy 151B.

Once the number of first responders to respond to the emergency (e.g., the total number of first responders required and the minimal quantities of different types of first responders required) is determined at 153A, the next step is to find first responders (at 153B), where individual first responders or a group of first responders may be identified. The first responders 160 may be provided with mobile PCs 165 that include location sensor 166. The locations of each first responders or a group of first responders may be stored in the database 131 via the sensor data receiver 141. Having known the minimal quantities of different types of first responders required and each first responder's location, the dispatching of individual selected first responders or a group of first responders may be done in multiple ways specified in the dispatching policy for each emergency type and/or for each first responder's type. In some embodiments, the particular "n" first responders of type "A" may be selected based on their latest known location by considering shortest distance to the emergency location 145B. In some embodiments, if specified in the dispatching policy, the first responders of type "A" in a particular radius "r" may be selected to respond to a particular emergency. To find the first responders to respond to the emergency at 153B, geographical information system 132 may be incorporated to derive locations, speed, traffic condition, travelling time, distances between points of interests as required. In some embodiments, the geographical information system 132 may be connected or synchronized with external systems or services that provides real-time traffic, or geographical data/information.

For the individual first responders identified based on first responder types and corresponding quantities determined at 722 and the dispatching policy specified for selecting individual first responders based on location, travelling time, etc., commands may be send to selected first responders' mobile PCs 165 with navigation instruction, emergency location 145B (which may be static or dynamic based on emergency type) and emergency details 145C. The selected first responders may have to acknowledge the acceptance of the command via the mobile PC 165. If a particular first responder rejected to engage an assigned emergency situation, the next available first responder of the same type may be decided based on the dispatch policy 151B.

In some embodiments, the notifications component 154 may be executed once the priority level 715 is decided to alert command centers, first responders 160, and the public 170. Alerts sent at 158 are meant to provide information regarding a particular emergency to relevant parties while commands sent at 157 are meant to provide mandatory or high priority order to first responders to engage and respond to a given emergency or emergency type. In some embodiments, the notifications component 154 may search the notifications policy 151C specified or learned or trained in the policy engine 151. This process is similar to search dispatch policy at 721 mentioned above where notification details are searched from the notifications policy 151C based on the emergency type 145A, the emergency location 145B, and the priority level 715.

In some embodiments, to decide alerts at 732, the notification policy 151C may include rules, mathematical or computational models to decide alerts (at 732) to send to individuals based on a plurality of commanders/command centers 733, types of first responders according to their superiority 734, location 735 or the like, and alert to public or not. if alert to public, to which locations and location ranges and so on. Once the alerts are decided at 732, resulting in criteria for sending alerts, the notifications component 154 may send alerts to various devices, applications, or services with appropriate levels of emergency details 145C. For example, fire emergencies alerts may be send to fire responders in a certain radius of an emergency via mobile PCs 165, while both fire commanders and security commanders may be alerted regarding the emergency situation to respective command center 190.

In some embodiments, if it is a high priority fire emergency, all the first responders in a wider radius may be alerted and the public may be alerted through the signage 171 and the mobile PCs 172. In some embodiments, the emergency details 145C provided in the alerts may include different levels of information based on the targeting person and application. For example, the command centers 190 may be provided with full details including relevant sensor data while the public may be provided with limited information such as emergency type and location. To provide alerts, the notification component 154 may make use of Hypertext Transfer Protocol (HTTP), social network interfaces, public switched telephone network (PSTN) channels, SMSs, or messaging protocols such as Message Queue Telemetry Transport (MQTT) or the like.

Figure 8:
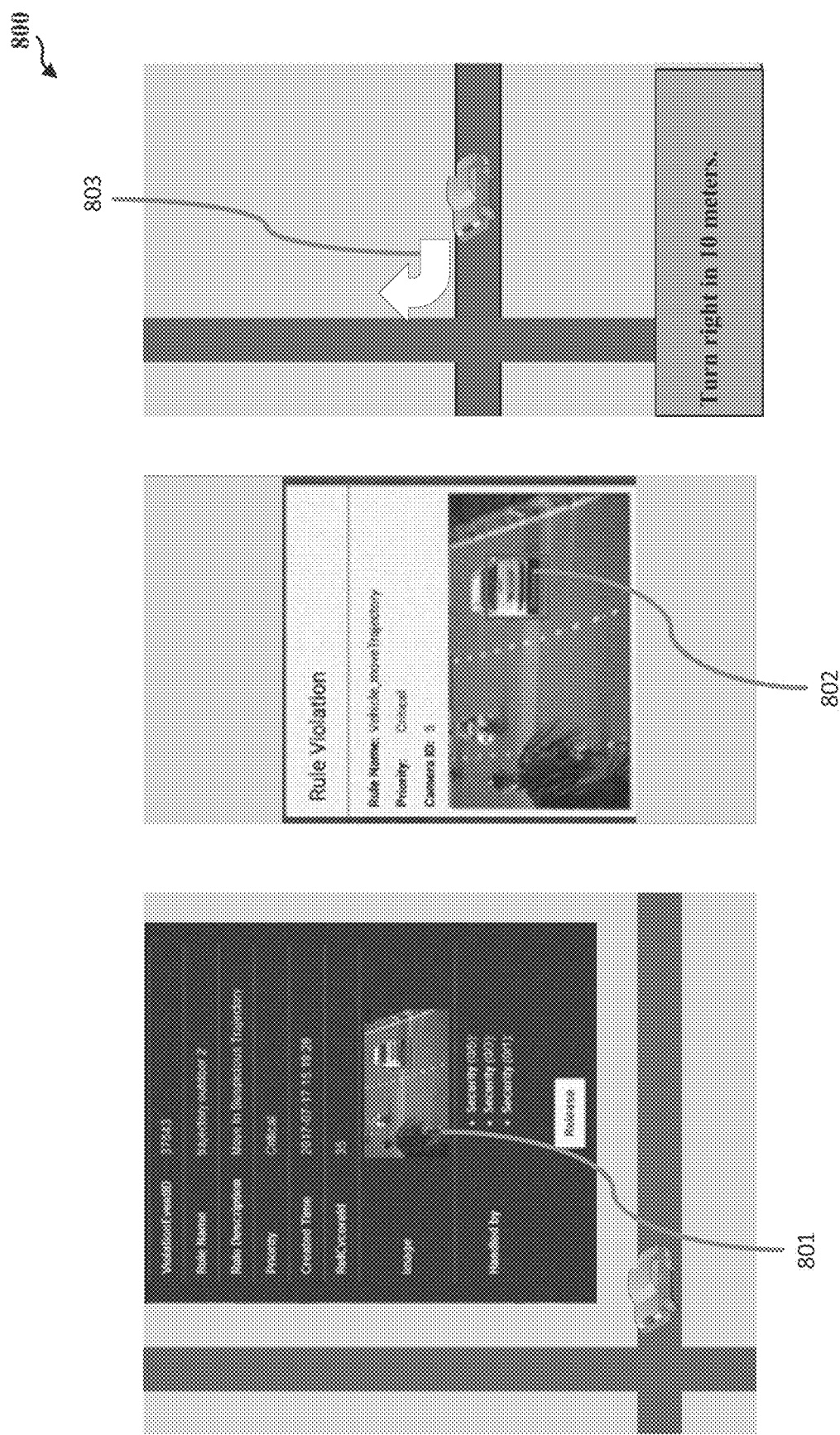
FIG. 8 is a diagram illustrating examples of alerts or command details that may be sent by the notifications component.

FIG. 8 is a diagram 800 illustrating examples of alerts or command details that may be sent by the notifications component 154. For example, an alert 801 may be sent to the command center 190 to inform the commanders or supervisors 180 regarding the detection of a suspicious vehicle. The alert 801 may include image received from sensors, time, priority, emergency type, and first responder allocation determined at 153B. In another example, an alert 802 may be provided to first responders' mobile PCs upon determinations made at 732. The alert 802 may include details of emergency location, image of the suspicious vehicle, sensor details priority, and emergency type. In yet another example, navigational instructions 803 may be provided to the first responders' mobile PC 165 via the send commands component 157 to respond to the emergency situation.

Figure 9:
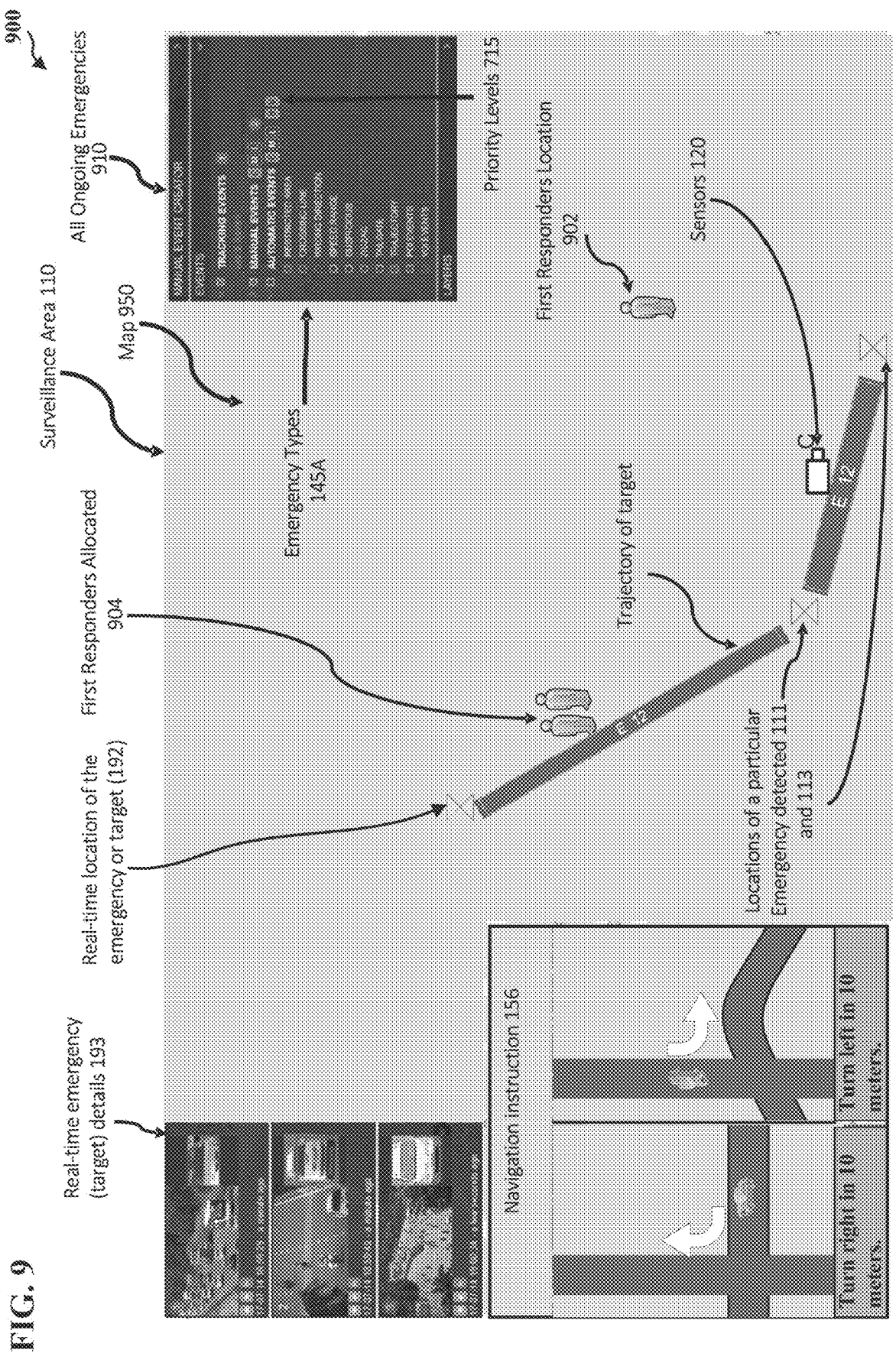
FIG. 9 is a diagram illustrating an example view of information presented at the command center in accordance with some embodiments of the disclosure.

FIG. 9 is a diagram 900 illustrating an example view of information presented at the command center 190 in accordance with some embodiments of the disclosure. In the example, there may be a rule defined to identify a suspicious vehicle of white color entering or travelling through a certain location. In such a situation, the emergency situation location may be changed over time from location 111 to location 113 or other locations over a trajectory 112 in the surveillance area 110. The command center 190 may observe the surveillance area 110 by utilizing a map or map service provided by the geographical information system 132.

In some embodiments, the sensors 120 may be shown in the map at a specified or current location. By clicking on icons of the sensors 120, a commander may be able to investigate sensor data, metadata, detected rules, statistical information, and history analytics, or the like. In some embodiments, the latest location 902 of a first responder may be shown on the geographical map 950. A commander may be able to investigate location history of the first responder, and sensor data collected by camera of the mobile PC 165 or any other wearable sensor carried by the first responder.

In some embodiments, all ongoing emergencies 910 may be visualized with icons or with a tree like structure with respect to different emergency types 145A. Once the rules engine 143 identifies an emergency, depending on the notification policy 151C, an icon of emergency details 145 may be populated in relevant emergency location (e.g., the real-time target location 192 in FIG. 3). The emergency type in this example is a non-static emergency (e.g., identifying a moving vehicle). This may result in multiple locations (e.g., locations 111, 113, 192) being identified and shown in the command center in their order of appearance in time while highlighting the latest location 192 extracted by the primitive features extraction component 142 and indicated in the emergency details 145.

In some embodiments, the emergency details including images or raw-data may be shown in the real-time emergency details 193. In some embodiments, the command center may visualize real-time allocation of selected or all first responders (e.g., the location 904 of all or selected first responders allocated at 153B. The command center may visualize different types of first responders and their assets as needed. Navigational instructions 156 provided to the first responders' mobile PCs 165 may be shown in the command center based on the map 950 and the geographical information system 132. In some embodiments, the command center may be equipped with navigational panels or trees to navigate through different emergency types 145A of different priority levels 715. In this manner, the command center may provide various types of visualizations in real-time regarding emergency situations.

The interface of the first responders' mobile PCs 165 may be similar to the interface in the command center. The first responders' mobile PCs may be provided with device specific computer application which can be connected to the automated surveillance system 100 via a wireless network such as 3G/4G, Wi-Fi, WLAN, or the like. By utilizing the application provided to the first responders, the first responders may be allowed to view sensors, emergency situations, sensor data, investigation ability, and most of the functions provided in the command center 190. However, the information provided to the first responders may be restricted based on their first responder type and their superiority that may be defined by the user setup component 206 in FIG. 2.

Figure 10:
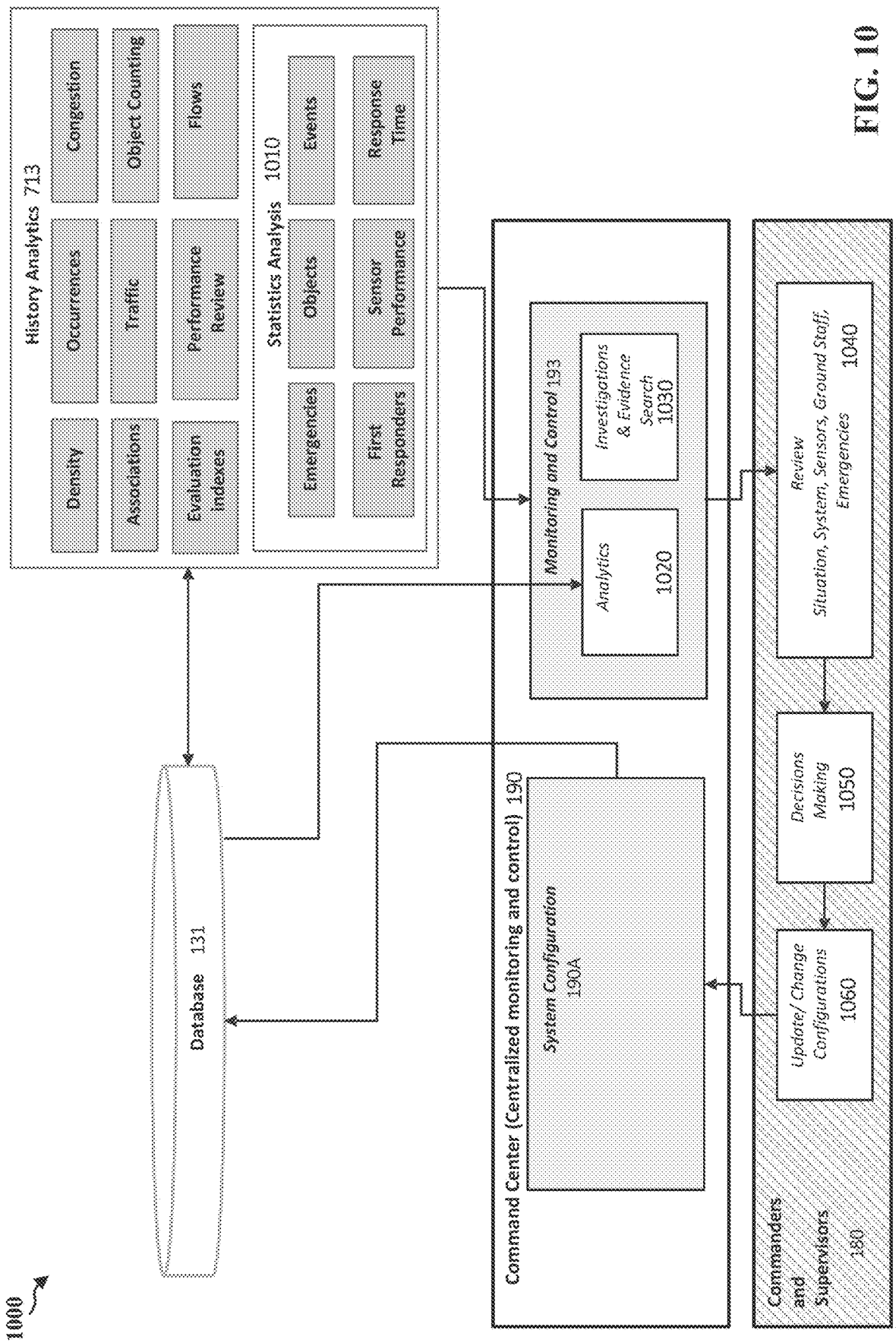
FIG. 10 shows an exemplary diagram of using analytics information provided by the automated surveillance system 100.

FIG. 10 shows an exemplary diagram 1000 of using analytics information provided by the automated surveillance system 100. Every module or component of the automated surveillance system 100 may store raw data and metadata in the database system 131 or similar storages such as logs, text files, binary files and so on. The stored data or information may include raw sensor data and metadata, primitive features of objects or events (e.g., human or vehicle data) extracted by the primitive features extraction component 142, identified emergencies, or threats or targets, response related data such as first responders allocation and so on.

All the collected, manipulated or derived data may be stored in the database 131. These data may be analyzed for further optimization of the emergency identification component 140, the emergency response component 150, the decision making, the sensor deployment, the deployment of first responders and their assets, etc.

The history analytics component 713, which may be used in the priority assessment 152, may derive additional analytics indexes, parameters or the like based on data stored in the database 131. In some embodiments, the analytics parameters, indexes, information, or manipulations may be visualized in the command center 190, the mobile PCs 165, or may define new rules in the rules engine 143. In some embodiments, the analytics parameters, indexes, information, or manipulations may be used to further optimize priority assessment, dispatching or dispatching policy, sensors deployment, or any other related tasks. In some embodiments, information provided by history analytics may be visualized as situation awareness for both the commanders and the first responders.

For example, the detection results of the primitive features extraction component 142 may allow the counting of humans appearing in a particular video sensor at a given period of time. The history analytics component 713 may use these detection results to count objects, obtain spatial-temporal density of humans, vehicles, or any other objects over a given period of time. The vehicle counting/densities or human counting/densities derived from the history analytics component 713 may be used to manipulate and visualize traffic and congestion with respect to a certain sensor or certain area of interest in the surveillance area 110.

Moreover, the history analytics component 713 may calculate various evaluation indexes or the like by combining multiple parameters. For example, the history analytics component 713 may calculate a "first responder dispatch quality index" by manipulating the average geographical disparity of density for each emergency type over a certain period and the density for the relevant first responders types (to a particular emergency) over the same period. Such dispatch quality index may include an indicator to represent the effectiveness of the quantities of first responders deployed in each geographic area over different time periods. Such dispatch quality index may be provided based on current situation, or based on a certain time period. A scale of such index may provide commanders, supervisors, or administrators a decision making ability based on the current or previous situation.

The evaluation indexes calculated by the history analytics component 713 may include but not limited to the average response time for each emergency type from each or all first responder types over a certain time period and/or certain geographical area. Another example may be the average patrolling time of first responders in general, or in a certain time period, or in a certain geographical area. There may be many evaluation indexes derived by the history analytics component 713 according to various embodiments.

In some embodiments, the history analytics component 713 may perform statistics analysis 1010 on various data, metadata, or information stored in the database 131. For example, such statistical analysis may be conducted over a certain period of time or location based on emergencies and details, objects detected or object properties, events or event parameters, first responders and their behavior (e.g., working time, locations, etc.), sensor performance (e.g., bandwidth, object/event detection, etc.), response time and so on. These statistical analysis may result in the deriving of various indices and statistical parameters of the information of interest (e.g., mean, standard deviation). In some embodiments, the statistical analysis may be used for visualizations and retraining of computational models used in the automation system (e.g., the computation models in the primitive features extraction component 142).

In some embodiments, the information, data, and metadata in the database 131 or the history analytics component 713 may be used in the command center 190 for better operating of the monitoring and control component 1908. The command center 190 is expected to provide comprehensive situation awareness based on real-time emergency situations (such as in FIG. 9), investigation and evidence search capability (at 1030, may be at 505 in FIG. 5), on ground analytics situation for decision making 1050 for optimization of emergency response or business operations. In order to provide better decision making 1050, these history analytics 713 may be used in command center to review (at 1040) situation, system resources, sensors, analytics first responders or emergency situation. In addition, any other data, information or metadata extracted by the automation system may be incorporated in the history analytics 713 to visualize the results of analytics 1020 in the command center interactively as needed by the commanders or first responders.

Based on reviews performed at 1030, the commanders and supervisors may make decisions to update/change sensors and its locations, rules, first responder resources, or the like, and may update the automation system via the system configuration component 190A.

Figure 11:
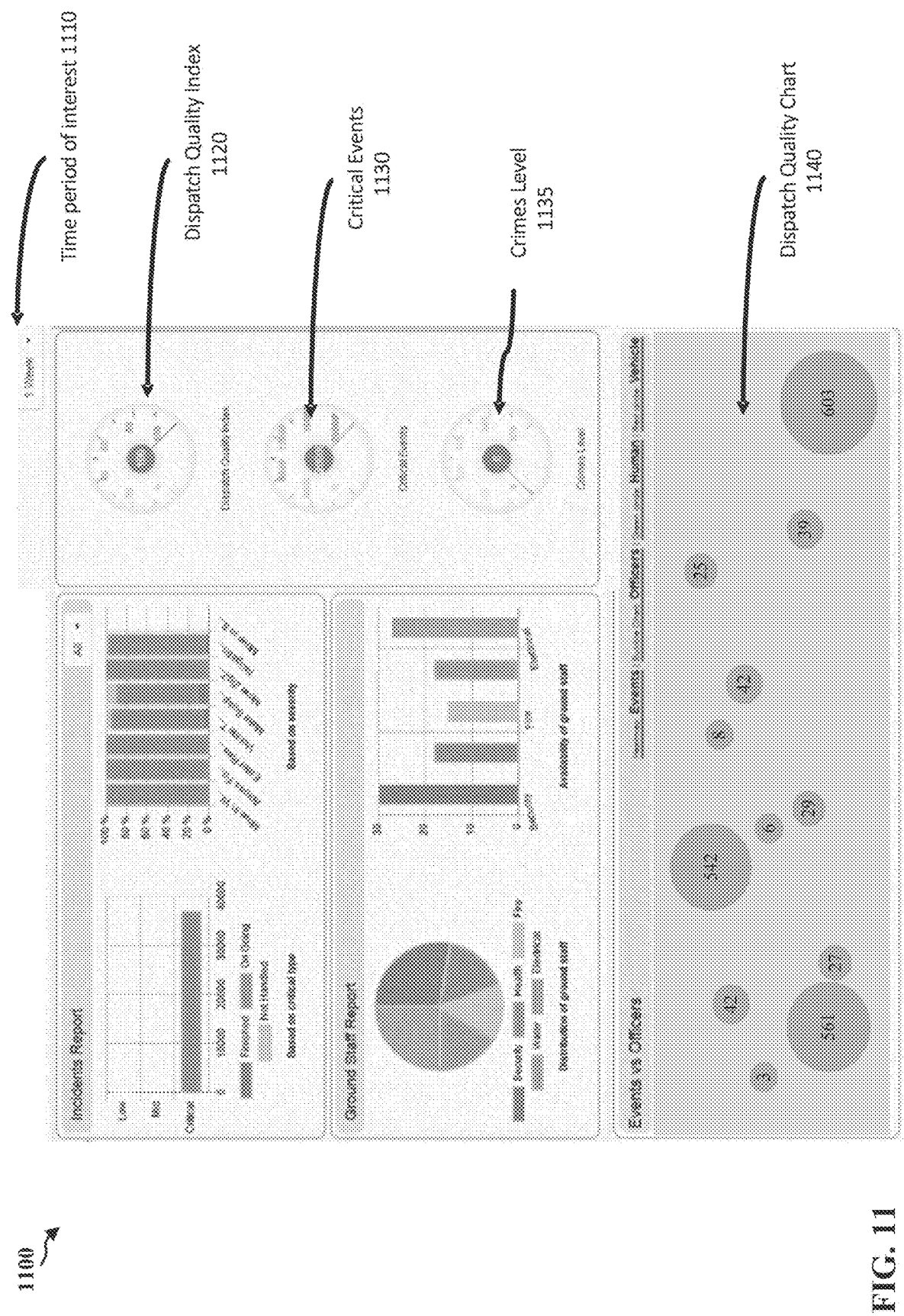
FIG. 11 shows an exemplary design of the visualization of the analytics at the command center using the database and the history analytics.

FIG. 11 shows an exemplary design of the visualization of the analytics 1020 at the command center using the database 131 and the history analytics 713. According to various embodiments, the command center may need to get situation awareness regarding the emergency identified, the first responders' behavior and location, or various indices related to the evaluation of operations, systems, and tasks according to certain time period and/or according a region/area of interest in the surveillance area 110. For example, as indicated in diagram 1100, a commander might select a certain time period of interest 1110. Based on this time period of interest 1110, the command center 190 may show the number of emergencies identified or detected 1130, statistics during the period of interest with respect to emergency type 145A and priority level 715. The detected emergencies 1130 may be derived from the database 131 by utilizing the rules engine 143 for emergency identifications.

In some embodiments, the command center may visualize first responders (a.k.a. ground staff) types and quantities that is detected during the period of interest 1110 and at a region of interest. Based on the location of mobile PC 165, user meta data stored in the database 131, and by incorporating geospatial querying of locations based on geographical information system 132, the command center may show the first responders presence. In some embodiments, the densities of emergencies may be calculated based on priorities, emergency types, and object types. The densities of emergencies may be filtered and shown as heat maps, bubble charts, charts or the like, and shown on a map-based interface to visualize disparity between emergency situations and first responders' locations as in dispatch quality chart 1140. In some embodiments, the dispatch quality chart 1140 may indicate the differences using heat maps or the like by utilizing the database 131 and the history analytics 713 bases on a certain period of interest 1110 and/or a region of interest.

In some embodiments, various evaluation indexes calculated or derived in history analytics may be shown in the command center. These evaluation indexes may include dispatch quality index 1120, the number of critical events/emergencies 1130 (e.g., high priority events/emergencies), crimes level or emergencies level 1135 that represents the average difference of the identified emergencies according to historical averages (e.g., averages of last day, last 6 hours, etc.). In some embodiments, these evaluation indexes may be calculated based on a time period of interest 1110 and a region of interest.

In addition to aforementioned cumulative measures over the time period of interest 1110, there may be a series of information manipulations according to periodic intervals of the selected time period of interest 1110. For example, if time period of interest 1110 is one month, the data or information may be shown according to history analytics 173 that is on daily basis, hourly basis, etc. that are within time period of interest 1110 and/or a certain region of interest.

In some embodiments, the aforementioned visualization at the command center may be used in the mobile PCs 165 and may include various other history analytics 713 including but not limited to, densities of events, objects (such as humans, vehicle, vessels, boats), object counters, simulations that shows differences or changes of densities, emergencies and first responders location over a certain period of interest 1110 and so on.

According to various embodiments, the history analytics 173 may be used in automatic optimization of the emergency identification component 140 or the emergency response component 150. For example, emergency situations in a particular surveillance area 110 may be changing yearly, monthly, daily, hourly or the like due to various social, political, economic, cultural reasons. For example, if there is a yearly cultural event in a particular city (e.g., the surveillance area 110), such situations may lead to more emergencies. In another example, if on ground infrastructure such as transportation or retail or the like is changed, emergency situation may be changed due to varying densities of human, vehicles or any other critical facts.

In some embodiments, the quantities or types of first responders' deployments may need to be changed to minimize emergency response time and also to accommodate response for the growing number of emergency situations. In some embodiments, a decreasing of emergency situations of all types or some of the types may be possible. In such a demand decreasing situation, additional first responders and resources may need to be distributed or allocated to higher demanding regions within the surveillance area 110. In some embodiments, if emergency situations and locations can be predicted based on various time intervals over a day, week, month, or year, first responders may be deployed in highly probable emergency locations to provide emergency response in even shorter time (i.e., able to reach the emergency location faster than in a non-predicted scenario).

Making such decisions manually by commanders and supervisors 180 may be time consuming and may not be productive. Thus, the history analytics 173 may be incorporated to predict emergency situations demand and optimize first responders and their associated resources/assets based on a certain evaluation index in the history analytics 173. Such optimization may ensure optimal deployment of first responders on ground (or dedicated base stations) in order to response to an emergency in shorter time and also to allocate resource optimally based on demand over a certain period of time.

Figure 12:
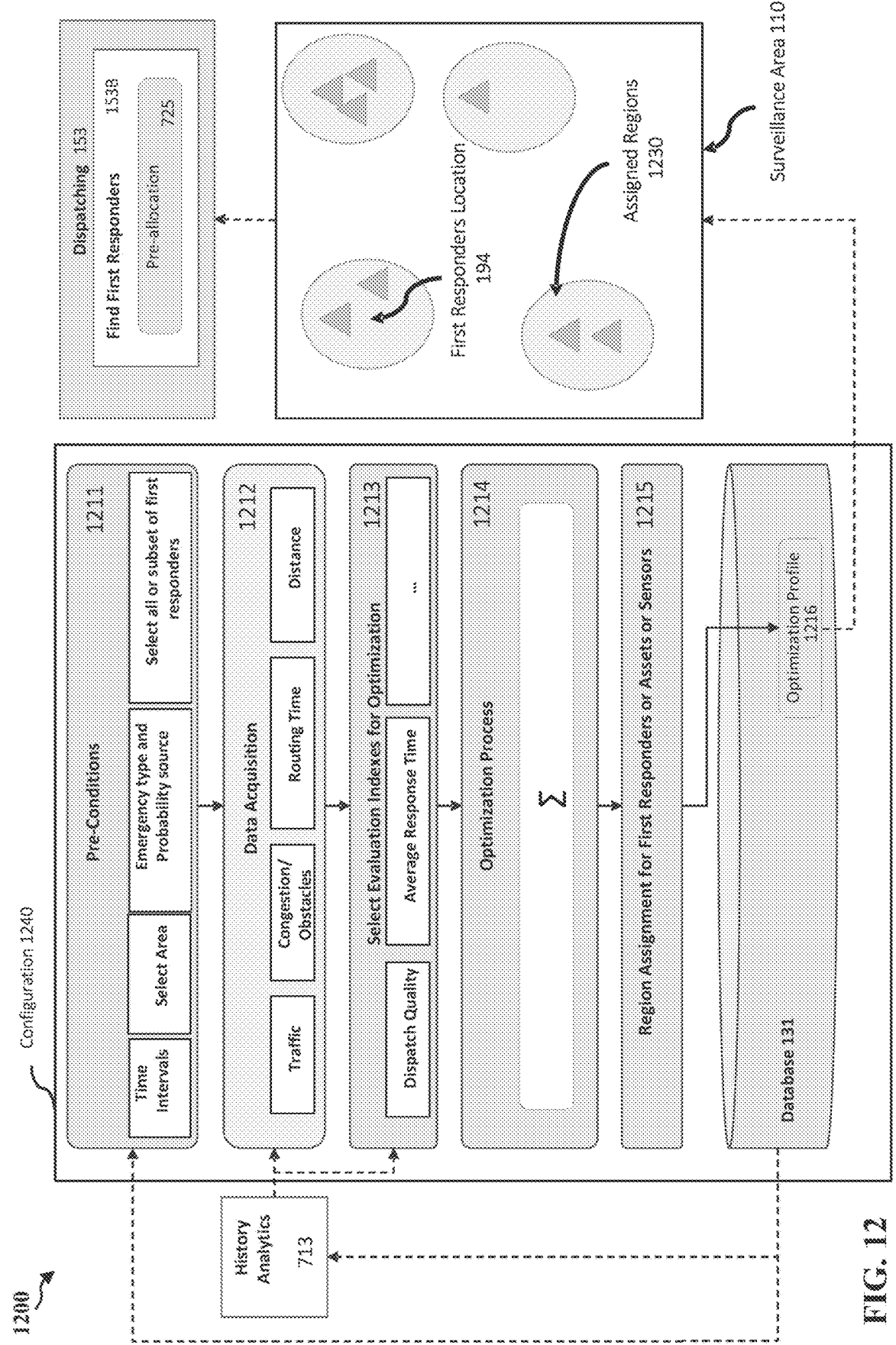
FIG. 12 is a diagram illustrating an example of a computing system in which optimization of the deployment of first responders is performed prior to the emergency situation takes place by utilizing the history analytics to minimize response time and distribute first responders optimally with appropriate quantities.

FIG. 12 is a diagram 1200 illustrating an example of a computing system in which optimization of the deployment of first responders is performed prior to the emergency situation takes place by utilizing the history analytics 173 to minimize response time and distribute first responders optimally with appropriate quantities. Such optimization may be conducted for the deployment of first responders, the deployment of first responder asset (e.g., vehicles, trucks, guns, ladders, or any other asset or resource) and sensors as well. These optimizations are herein referred to as resources and response optimization (RRO).

The RRO may need to be executed based on a plurality of configurations 1240 provided by the commanders and supervisors 180 via the command center 190 or through any other external systems. There may exist a plurality of RROs based on different emergency types 145B, priority levels 715, and first responder types (e.g., fire 161, security 162, etc.). In some embodiments, there may exist a plurality of RROs based on working shifts, time intervals (e.g., daily, weekly, and hourly). In some embodiments, a configuration 1240 may indicate the frequency intervals where each RRO should be updated or re-calculated, and update the database 131. For example, there may be an RRO configuration to update or change deployment of fire responders daily, considering 8 hour shifts per day, and to be changed every month. In this case, there may be three RROs conducted and stored in the database 131. The next RRO execution may be conducted automatically after one month and update the database 131.

Each RRO may output an optimization profile 1216, which may be stored in the database 131 or any other storage medium. For optimization of first responders or assets, one RRO execution may create one or more optimization profiles 1216 that indicate multiple regions 1230 assigned to different quantities of first responders of different types or assets. In some embodiments, the RRO may assign a particular location to first responders of different types or assets. For example, if fire responders are based on a particular base station, the RRO may output a plurality of locations 194 for the first responders and may indicate the plurality of locations 194 in a relevant optimization profile 1216.

An RRO may include multiple kinds of numerical, geographical calculation and may be conducted according to a defined configuration 1240. Each RRO may have access to the database 131, the history analytics 713, and the geographical information system 132 to gather relevant data for RRO calculation and manipulations.

To conduct each RRO, a set of pre-conditions 1211 may need to be defined. A data acquisition process 1212 may be conducted according to the set or pre-conditions 1211 prior to executing a computational optimization method. The pre-conditions 1211 may include time intervals for which a particular optimization may be applied (e.g., shift interval), geographical area of interest, emergency types and sources for emergency probability calculation, types or subset of relevant first responders/assets, and so on. The emergency type within the pre-conditions 1211 may allow the RRO to select one more emergency types corresponding to the priority levels of interest. For selected emergency types, the probability calculation may be either done manually or automatically. Manual probability calculation may be done by utilizing the history analytics 173 density, occurrence information or the like according to various embodiments. In some embodiments, probabilities may be manually defined by the commanders for one or more configurations 1240. These probabilities may be related to the prediction of selected emergencies types over the selected time interval in selected area to optimize deployment of selected first responders or the related assets. In some embodiments, probability calculation period (e.g., probability calculation for past day, week, month, year, or any specified time period) may be selected.

In addition to probability of selected emergency types, an RRO may consider ground conditions such as traffic, obstacles, distance, travel time between different points, location, areas within surveillance area 110. Thus, an RRO may consider probability of selected emergency type as well as travelling time/distance constraints with traffic and congested situations. In some embodiments, an RRO may also consider any other factors that may affect response time or meeting demand. In some embodiments, the data acquisition process 1212 (e.g., traffic, congestion, obstacles, distances, travel times, densities, object counts, etc.) may be conducted based on criteria defined in the pre-conditions 1211 (e.g., selected area, emergency types, or probability source, etc.).

In order to provide necessary data for the data acquisition process 212 for various and multiple RRO configurations 1240, the history analytics 713 may gather traffic, travelling time, congestion or similar data needed periodically (e.g., using a batch computational process) via the geographical information system 132 or external data providers. Such data may be periodically gathered according to pre-defined time intervals by the history analytics 713 and may be stored in the database 131 to support various RROs. For example, the traffic data may be gathered every 30 minutes covering the entire surveillance area 110 based on different road segments, road junctions, and so on. These geographical data such as traffic, congestion, travelling time, distance may be further gathered periodically based on grids, areas, points, paths, roads or junctions, etc. In some embodiments, the data acquisition process 1212 may conduct additional analytics, statistical calculations based on the configuration 1240 prior to executing the optimization process. The data acquisition process 1212 may conduct extract, transform or load functions, statistical manipulations on history analytics 713 or any related data. For example, peak or average traffic history may be further calculated by the data acquisition process 1212 prior to optimization according to various embodiments. Such data preparation, pre-processing steps may be conducted by the data acquisition process 1212 according to various embodiments.

A certain RRO may be conducted targeting a certain cost function, evaluation index or the like by considering the history analytics 713 (i.e., based on historical situation during the period of interest). For example, a certain RRO may be expected to maximize the quality of first responder dispatching (e.g., for a particular emergency type), i.e., minimizing average distances between emergency locations and first responders locations using emergency situation prediction based on historical data and travelling time/ distance that takes traffic into consideration as well. In some embodiments, a cost function may be defined based on different data such as traffic condition, distance, travel time, etc. The cost function may be minimized computationally to find the optimal first responder deployment or asset allocation, etc. Such evaluation index selection (at 1213) may be conducted after the data equation process 1212.

Once pre-conditions 1211 are defined, the data acquisition process 1212 may be conducted and the evaluation indexes for optimization may be selected. A computation optimization or a constrained optimization process 1214 may be executed. Such optimization process 1214 may find the optimal first responder deployment across selected region by finding the optimization profile 1216 that minimizes the selected evaluation index at 1213. In order to conduct such calculation, the optimization process 1214 may incorporate machine learning, artificial intelligence, convex/non-convex optimization, mixed integer programming, dynamic programming or the like according to various embodiments.

The optimization process 1214 may conduct (at 1215) a region assignment for first responders, assets, or sensors based on configuration 1240 and the region assignment may be stored in the database 131 as related optimization profile 1216.

According to various embodiments, the optimization profile 1216 may be used by the dispatch policy 151B and the dispatching component 153 to find first responders (at 153B) based on pre-allocated regions in the optimization profiles 1216. In some embodiments, there may be a plurality of optimization profiles based on different shifts, priority levels, emergency types, first responder types and so on, where search dispatch policy at 721 may help in deciding relevant optimization profile 1216 in the event where an emergency is identified.

In some embodiments, the command center 190 may visualize the first responders' locations that are assigned based on selected optimization profiles 1216 (for selected emergency type, priority level, or first responder type, etc.). In some embodiments, an alert may be sent to the command center and the mobile PCs 165 of relevant first responder if a particular first responder indicated in a particular optimization profile 1216 is out of the region indicated in 1216. Each first responder may be notified with allocated regions/ locations or assets for various time periods, intervals or shifts based on the optimization profiles 1216. These notifications are either sent to the relevant first responders' mobile PCs 165 or visualized in the first responders' mobile PCs 165 by utilizing a geographical map.

According to various embodiments, when a rule is created by a commander or a first responder via the rules engine 143, the dispatching policy may be selected as "pre-assigned", or "pre-allocated" that may lead the dispatching to proceed with the relevant optimization profile 1216 according to the emergency details 145 of a particular emergency.

According to various embodiments, the optimization process 1214 may be used to decide the optimal number of resources by the historical analytics component 713 based predictions. For example, existing quantities of first responders or resources/assets may not be adequate or may be available more than the required levels. In such situations, the optimization process 1214 may be used to decide the minimal resources/assets and first responder quantities required to satisfy a particular evaluation index selected at 1213. Such optimization process 1214 may further be used to decide time varying resource/assets or first responder quantities according to the historical analytics components 713 in different time segments (daily, weekly, monthly etc.). In some embodiments, the resulting optimization profiles 1216 from aforementioned process, may be used to simulate emergency situations, first responders, resources, assets of different kinds and emergency response based on the historical analytics component 713 at the command center 190. For example, the historical analytics component 713 may be used to simulate road traffic data, emergency densities and so on to simulate emergency response to a simulated emergency situation with simulated first responder, assets and resources. Such simulation may further indicate evaluation indexes for all simulated emergencies.

The automation system 130 may be integrated or connected with multiple types of commanders, supervisors, first responders and external systems that can be of different superiority and accessibility levels. These information, notification, data, analytics and situation awareness provided may include sensitive information that is related to privacy, security, and secrets. Therefore, information provided by the automation system may be restricted based on the superiority level and the operational scope of a commanders and first responders. In some embodiments, varieties of data, information, analytics, and situation awareness may be provided by the automated surveillance system 100. Providing too much information to commanders or first responders may lead to information overload, resulting difficulties in paying attention to critical information.

Figure 13:
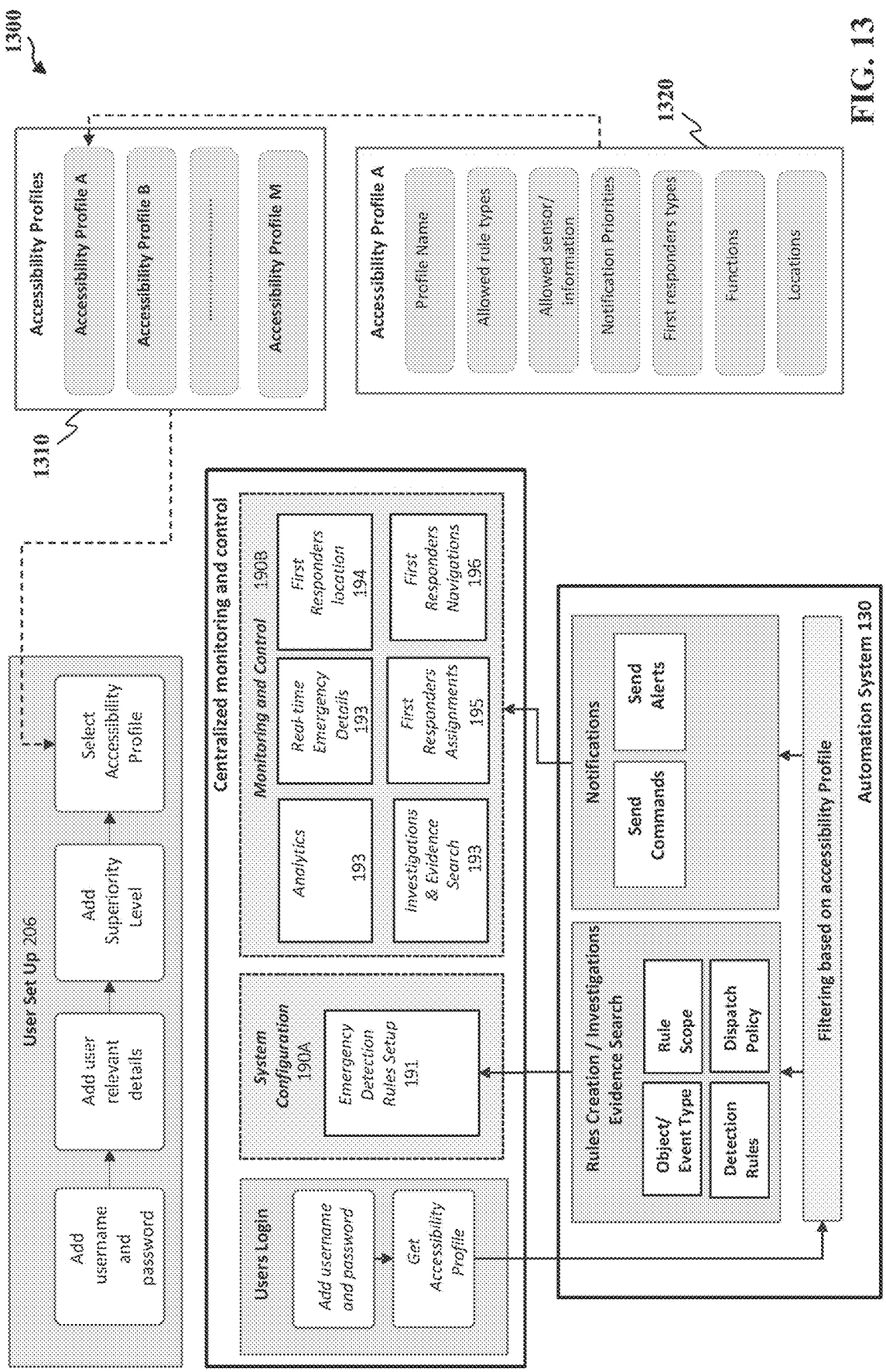
FIG. 13 shows a simple flow diagram of controlling access to information and functionalities among commanders and first responders of multiple types and superiority levels.

FIG. 13 shows a simple flow diagram 1300 of controlling access to information and functionalities among commanders and first responders of multiple types and superiority levels. The automation system of some embodiments may control accessibility to information, data, analytics, notification, alerts or the like based on the rules engine 143 and priority levels 715. For example, accessibilities relevant to different superiority levels (e.g., commanders, first responders) may be represented as accessibility profiles 1310, which include a plurality of accessibility profiles 1320.

A particular accessibility profile 1320 may be relevant to a subset of commanders, first responders, or the like of the same superiority level, who may be in charge of certain or all emergency types. Such accessibility profile 1320 (e.g., accessibility profile A) may indicate (defined by an accessibility profile creator) the allowed rules types (e.g., emergency types), the allowed priority levels or priority level range. In such cases, rule creation and alerts may be restricted to a particular user based on the emergency types 145A and the priority level 715.

In some embodiments, a particular accessibility profile 1320 may indicate the sensors allowed, where rules creation and alerts received may only be restricted to the sensors specified. In some embodiments, a particular accessibility profile 1320 may indicate certain functions, where only the specified functions may be provided to a user who is given the particular accessibility profile 1320. In some embodiments, the accessibility profile 1320 may include but not limited to location or regions information, where a particular user may only give alerts, notifications within specified location/region.

These accessibility profiles 1310 may be created by a system administrator, commander with a top superiority level, and may be assigned to different users such as commanders, first responders, and external systems by the user setup component 206 in the system configuration component 190A in FIG. 2.

During a user's login to the command center application 190 or a mobile application provided in the mobile PCs 165 of first responders or the mobile PCs 172 of the public, relevant accessibility profile may be obtained, and rules creation, alerts, notification, functions, data, or the like may be restricted as specified in the relevant accessibility profiles 1310.

The accessibility profiles 1310 may be used to provide product or solution licenses in commercial settings. According to various embodiments, the automation system 130 may be integrated with a large number of sensors, first responders, their mobile PCs, and external information sources. Such large scale deployment of the automation system 130 may demand large system resource requirement such as storage and processing units. In order to manage such resources, the rules engine 143 and the priority levels 715 of a particular emergency may be incorporated.

Figure 14:
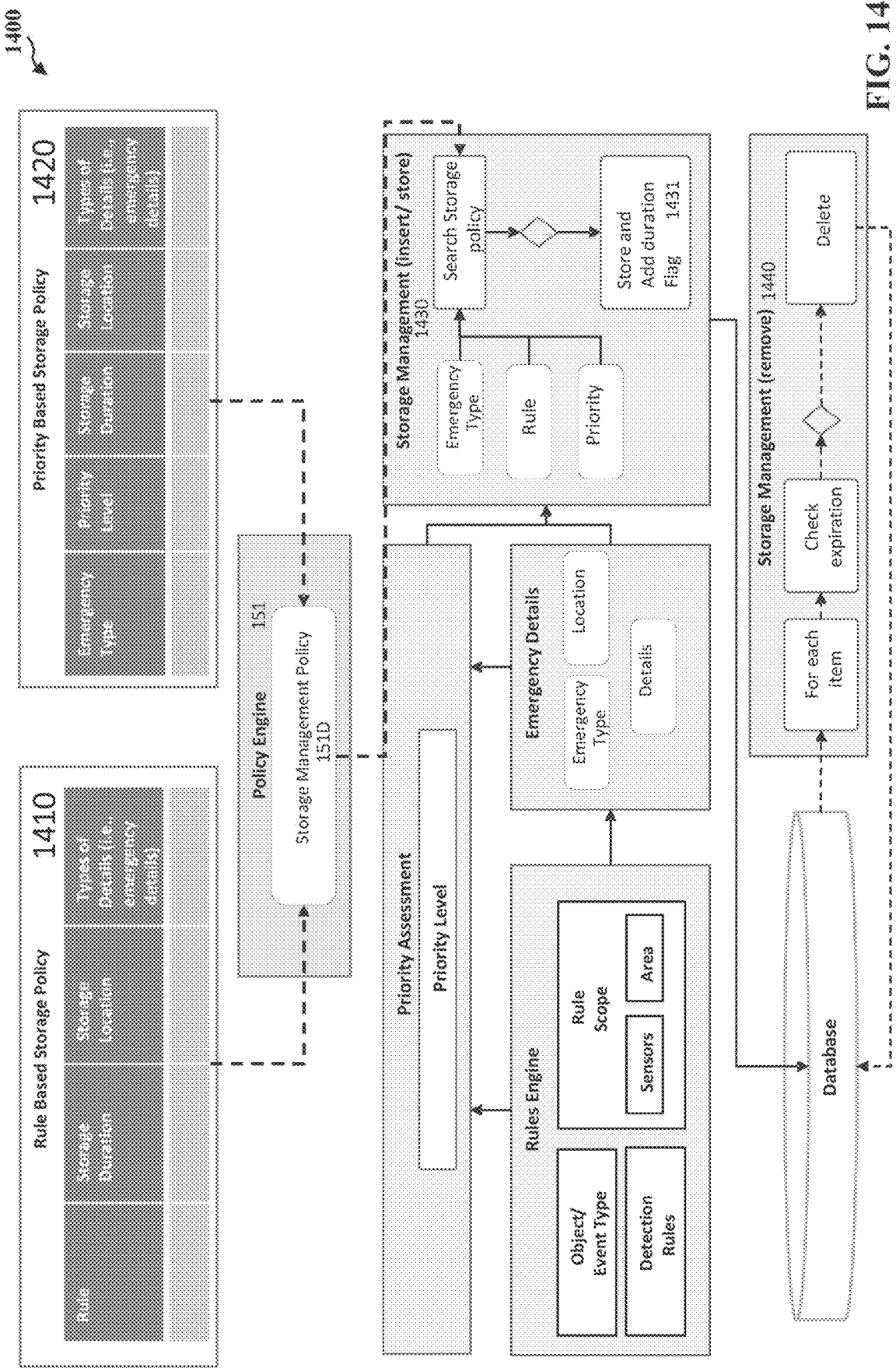
FIG. 14 is a flow diagram illustrating an example of managing system resources based on the rules engine and priority levels.

FIG. 14 is a flow diagram 1400 illustrating an example of managing system resources based on the rules engine and priority levels. In some embodiments, the policy engine 151 may include a storage management policy 151D that defines storage duration, location and duration to store based on each rule, rule type (e.g., emergency type) or priority level 715.

In some embodiments, each rule created or emergency detection type defined (at 502 in FIG. 5) may be defined with a storage policy including but not limited to storage location (if the database 131 or any other storage being used are distributed), storage duration indicating how long the data, information should be kept in the database 131 and so on. Therefore, every time an emergency is identified, such emergency details, metadata or the like may be stored or inserted into the database with a storage duration flag via the storage management component 1430. The storage management component 1440 may periodically select all the records in the database 131 where duration flag exists and is expired, and may delete such recorded subsequently. Such storage policy may also be applied to sensor data and data units, first responders metadata such as locations, history analytics 713 or any other data, information, metadata or the like that is being stored in the database 131.

The aforementioned storage management policy 151D may be used to manage other system resources. For example, the storage management policy may allocate varying computational processing resources based on individual sensors, sensor types, and emergency types. Furthermore, such data storage management policy may be used to dynamically increase computational processing resources for a particular set of sensors, or a particular set of primitive features based on rules and priority assessment as described in aforementioned examples.

According to various embodiments, additional coverage of sensors may be required during high priority emergency identifications or critical situations. Such additional coverage of sensors may be done via mobile, autonomous and/or controllable sensors. For example, aerial surveillance via flying drones may be conducted when there is not enough video sensors (such as surveillance cameras) to monitor a threat or suspicious person who is on the move. In such a situation, managing multiple mobile, autonomous and/or controllable sensors may require continuous guidance and control signals to be sent, causing additional manual efforts and additional devices to control. Therefore, the automation system 130 of some embodiments may be used in such a situation where mobile, autonomous and/or controllable sensors may need to be deployed based on demands, high priority or critical situation, or for repeated patrolling requirements.

Figure 15:
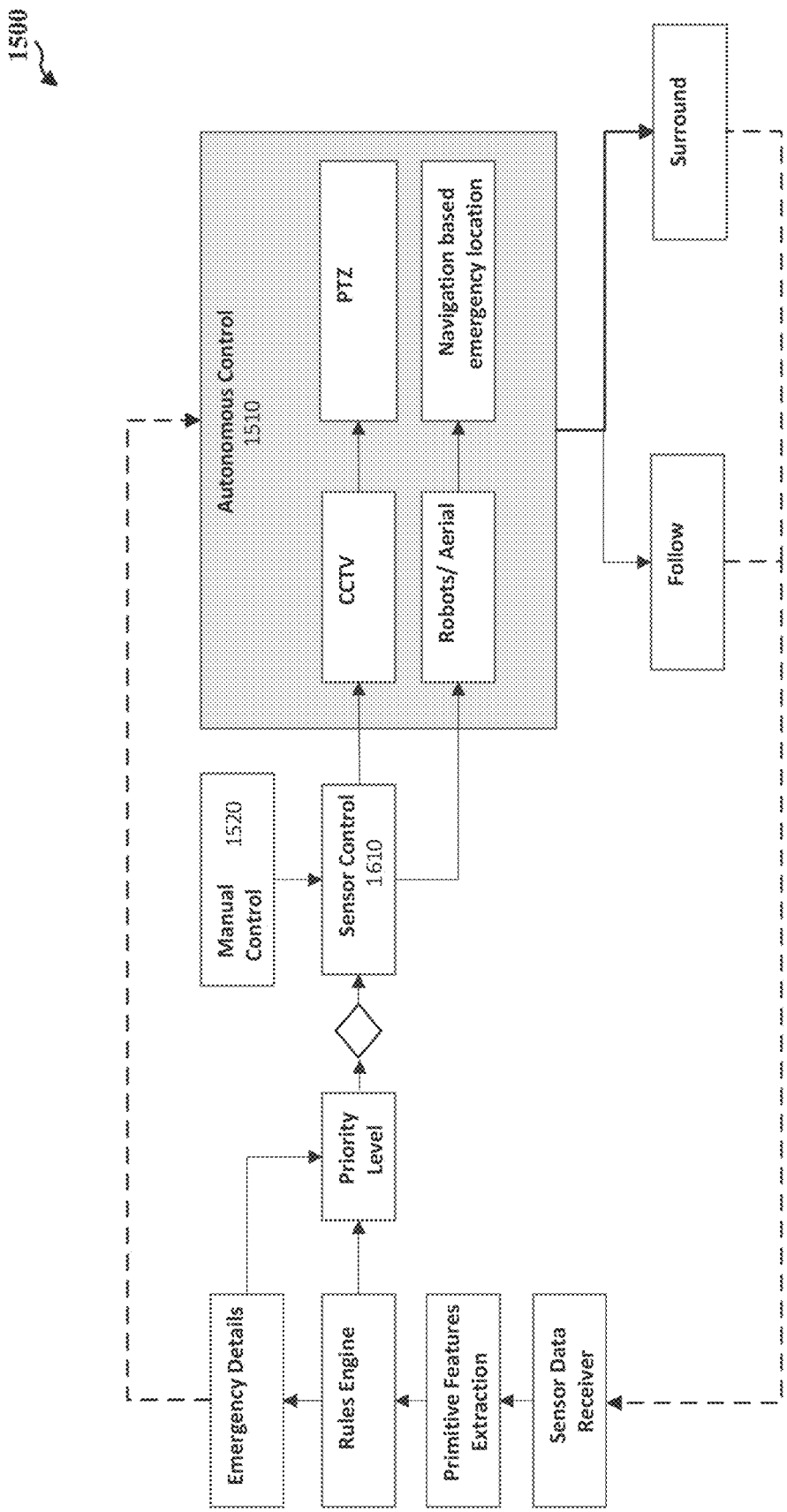
FIG. 15 is a diagram illustrating an example of controlling an autonomous sensor when a high priority emergency is identified.

FIG. 15 is a diagram 1500 illustrating an example of controlling an autonomous sensor when a high priority emergency is identified. In some embodiments, in the presence of a high priority emergency being identified based on the priority level 715, the automation system 130 may be integrated with a sensor control component 1510, which may actuate and control the sensors 120 based on the emergency details 145 that is being updated in real-time or near real-time by the primitive features extraction component 142 and the rules engine 143. In some embodiments, pan-tilt-zoom (PTZ) surveillance cameras may be moved in pitch, yaw, or roll directions autonomous as an emergency target is moved, where the moving locations are identified by the primitive features extraction component 142 and update in emergency details as the emergency location 145B.

According to various embodiments, the sensor control component 1510 may activate drones or robots as a mobile object and may send them to the latest known location of an emergency or target provided by the emergency details 145. Such autonomous navigation system may be pre-trained in computation models and may be used directly by the drones or robots. In some embodiments, drones or robots may include additional sensors such as video sensors that send collected data to the sensor data receiver 141 to be monitored in the command center and also to extract the latest emergency details 145 (to obtain latest location and image for example). A drone or robot may continuously follow a given moving target as the location is update by the emergency details 145. To reduce network communication time, the drone or robots may include a light weight sensor data receiver and emergency details extractor to make the autonomous navigation and control effective.

According to various embodiments, one or more sensors such as robots or drones may be allocated to monitor a particular emergency, target, or threat that is not static. In such situations, the autonomous control component 1510 may include multiple kinds of navigation methods such as following the target, surrounding the target with multiple sensors, and so on. A commander or responder may provide (at 1520) manual control capability to control any robot, drone, or any other sensor as needed.

Figure 16:
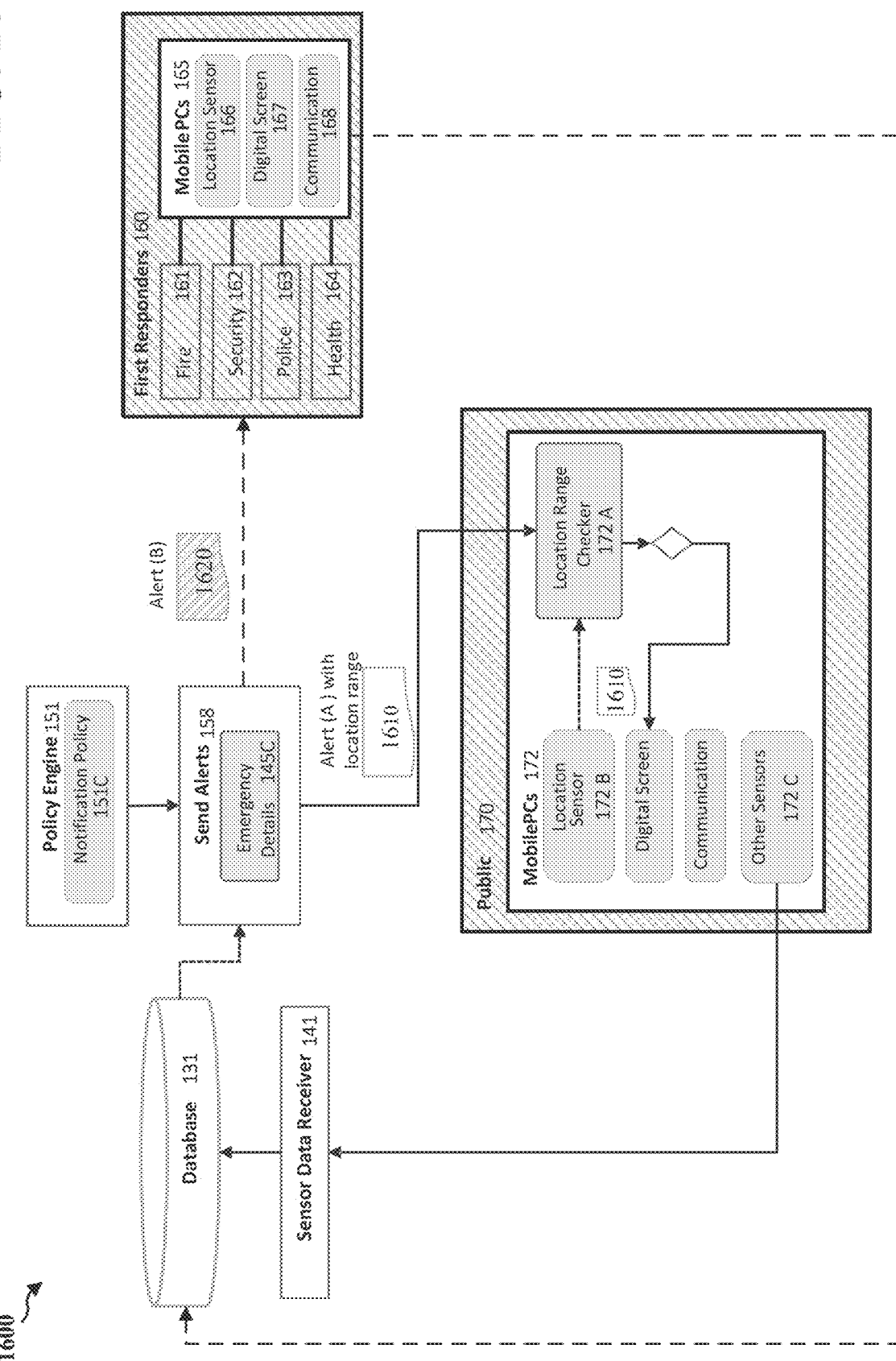
FIG. 16 a simplified diagram illustrating the alerts sent to the public and the first responders.

FIG. 16 a simplified diagram 1600 illustrating the alerts sent to the public 170 and the first responders 160. Alerts may be sent to the first responders, the commanders and the public for providing situation awareness about various emergency situations that may take place in a certain surveillance area. For example, the public 170 may be connected to the automation system 130 via a plurality of mobile PCs 172 that run an application to send or receive data, information or the like. In certain situations, mobile PCs 172's location metadata (e.g., obtained from location sensor 172B) may not be stored in the database 131 due to various reasons such as privacy. In such situations, the alerts sent at 158 may include alert 1610 with emergency details and an embedded location range where the given alert is applicable. Moreover, the application running on the mobile PCs 172 may include a location range checker 172A that may check whether a particular mobile PC 172 is in the range specified in the alert 1610. The alert 1610 may be sent to all public PCs 172 that may be located in different geographical locations. The location range checker 172A of each mobile PC 172 may conduct geographical manipulations, location or distance estimations based on data obtained by the location sensor 172B and the location specified in the alert 1610 to decide whether the current location of a particular mobile PC 172 is within the area of impact of the emergency. If a particular mobile PC 172 is within the location range specified by the alert 1610, the emergency details 145C provided by the alert 1610 may be displayed in the digital screen of the mobile PC 172.

In the previous example, the location range specified in the alert 1610 may be based on the priority assessment (e.g., at the priority assessment component 152) of an emergency and may also be based on the emergency type and the notification policy 151C. Furthermore, the emergency details 145C provided in the alert 1610 may be different from alert 1620 provided to the first responders for a given emergency. For example, the contents and contexts of alerts 1610 and 1620 may differ based on priority assessment, accessibility profiles 1310, type of emergency, and notification policy 151C. Emergency details provided in alerts 1610 and 1620 may include different kinds of emergency details. For example, based on emergency type, the alert 1610 may be provided with emergency type, location, and related details such as evacuation instructions, shelter information, safety guidance, navigation instructions for safety locations, etc., while alerts to first responders 160 (e.g., the alert 1620) may include more details of emergency, such as actual sensor data (e.g., suspicious persons' image), navigational instructions, other first responders locations or first responders allocated to respond to a particular emergency and so on.

In some embodiments, the public may be requested to allow their mobile PC 172's sensor data, such as data obtained by the location sensor 172B, other sensors 172C (e.g., camera, audio, etc.), to be used in further identification of emergencies, investigations, or evidence management. In such embodiments, the application running on the mobile PCs 172 may include interfaces to allow the automation system 130 to read the sensor data obtained by the mobile PCs 172. Those sensor date may be extracted by the sensor data receiver 141 and stored in the database 131. These data extracted by the sensor data receiver 141 may be used by various components of the automation system 130. In some situations, the public may upload historical data such as images, videos, audios, text messages, social network feeds stored in the mobile PC 172 upon request by the automation system 130 (e.g., based on request by the commander/supervisor or the first responders). Such uploaded data may be used to identify emergencies or perform investigations. In some embodiments, the uploaded date may be used by the historical analytics component 713.

In the previous example, when the alert 1620 is sent to the first responders' mobile PCs 165, the alert 1620 may be either sent to all first responders or sent to a selected set of first responders. When the alert 1620 regarding an emergency situation is sent to a selected set of first responders, the mobile PCs 165's location metadata stored and updated periodically in the database 131 may be used to filter the first responders based on their most recent locations stored in the database 131. The first responders to send alerts (at 158) may further be filtered or selected based on a particular emergency type, its priority assessment, the notification policy 151C, and the accessibility profiles 1310.

Figure 17:
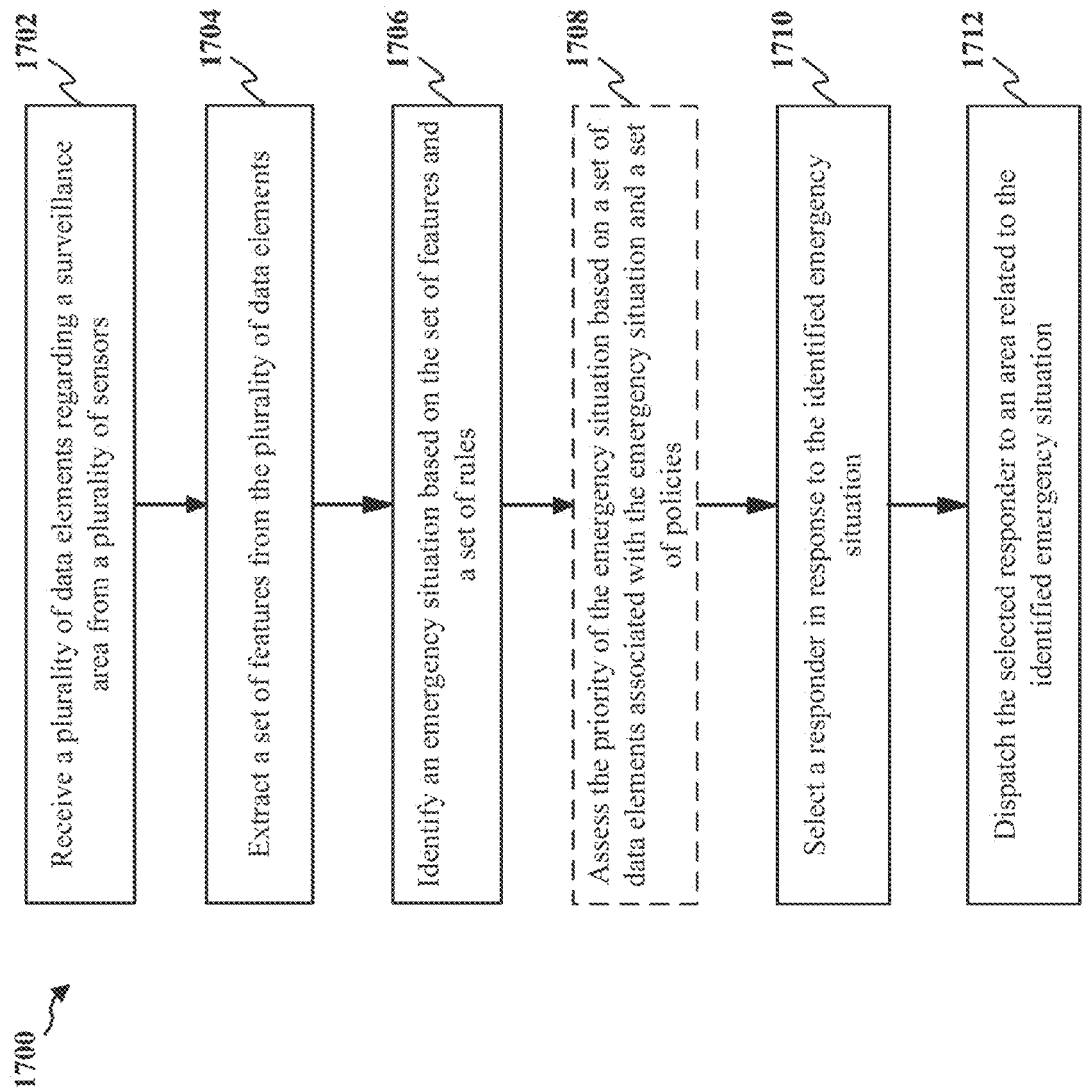
FIG. 17 is a flowchart of a method for the automation system described above.

FIG. 17 is a flowchart 1700 of a method for the automation system 130 described above. In one embodiment, the method may be performed by an apparatus (e.g., apparatus 1800), which may include one or more computing devices.

At 1702, the apparatus may receive a plurality of data elements regarding a surveillance area from a plurality of sensors. In one embodiment, the plurality of sensors may include one or more of video sensors, audio sensors, text sensors, weather sensors, traffic sensors, or building control sensors. In one embodiment, the plurality of sensors may include sensors equipped on mobile devices carried by the first responders. In one embodiment, the plurality of data elements may include raw data and metadata. A piece of metadata is data that provides information about one or more pieces of raw data. The metadata may be collected by the plurality of sensors or derived from the raw data.

At 1704, the apparatus may extract a set of features from the plurality of data elements. In one embodiment, the set of features may include one or more of representations, structures, anomalies, behaviors, or patterns.

At 1706, the apparatus may identify an emergency situation based on the set of features and a set of rules. In one embodiment, to identify the emergency situation based on the set of features and the set of rules, the apparatus may match the set of features with the set of rules.

At 1708, the apparatus may optionally assess the priority of the emergency situation based on a set of data elements associated with the emergency situation and a set of policies. In one embodiment, the apparatus may further control the accessibility from user to at least one component included in the apparatus based on the set of rules and the priority. In one embodiment, the apparatus may further manage the storage duration indicating a term during which the plurality of data elements is stored in a storage medium based on the set of rules and the priority of the emergency situation. In such an embodiment, the apparatus may further delete the plurality of data elements after the storage duration is elapsed.

In one embodiment, the apparatus may further control the plurality of sensors for tracking the emergency situation when the priority of the emergency situation is assessed as high priority. In one embodiment, the apparatus may further send a mobile object to the emergency situation. The mobile object may have a sensor for monitoring and tracking the emergency situation.

At 1710, the apparatus may select a responder in response to the identified emergency situation. In one embodiment, to select the responder, the apparatus may determine the number of responders that is allocated from each type of responders based on at least one of the priority of the emergency situation or the type of the emergency situation.

At 1712, the apparatus may dispatch the selected responder to an area related to the identified emergency situation. In one embodiment, the apparatus may further assign a set of responders to the area based on a profile. In one embodiment, the apparatus may further assign different quantities of responders of different types or assets to each of a plurality of regions. In one embodiment, the apparatus may further prepare the profile based on a set of preconditions, acquired ground conditions, and evaluation indexes.

In one embodiment, the apparatus may further accept modification of the set of rules at any time while the apparatus is in operation and update the set of rules in response to the accepting of the modification. In one embodiment, the apparatus may further provide a graphical user interface to accept a trajectory depicted on a video feed as a modification of the set of rules.

Figure 18:
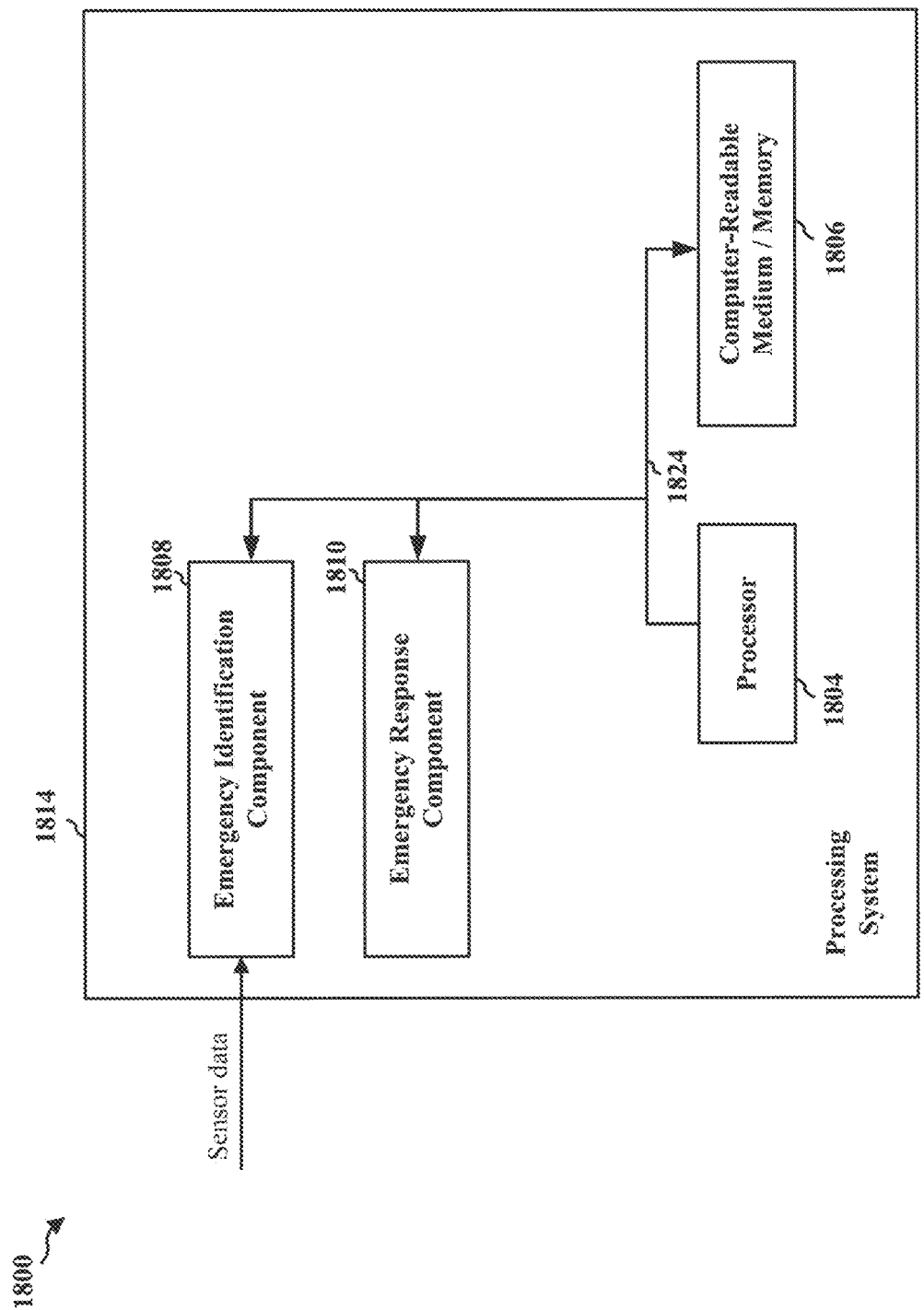
FIG. 18 is a diagram illustrating an example of a hardware implementation for an apparatus employing a processing system.

FIG. 18 is a diagram illustrating an example of a hardware implementation for an apparatus 1800 employing a processing system 1814. In one embodiment, the apparatus 1800 may implement the systems and methods described above in FIGS. 1-17. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1808, 1810, and the computer-readable medium/memory 1806. The bus 1824 may also link various other circuits such as timing sources, peripherals, voltage regulators, and power management circuits, which are well known in the art, and therefore, will not be described any further.

The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1808, 1810. The components may be software components running in the processor 1804, resident/stored in the computer readable medium/memory 1806, one or more hardware components coupled to the processor 1804, or some combination thereof.

In one embodiment, the emergency identification component 1808 may be the emergency identification component 140 described above. In one embodiment, the emergency response component 1810 may be the emergency response component 150 described above.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

In the following, various aspects of this disclosure will be illustrated:

Example 1 is an automated surveillance system. The system may include an automation system configured to: receive a plurality of data elements regarding a surveillance area from a plurality of sensors; extract a set of features from the plurality of data elements; identify an emergency situation based on the set of features and a set of rules; select a responder in response to the identified emergency situation; and dispatch the selected responder to an area related to the identified emergency situation.

In Example 2, the subject matter of Example 1 may optionally include that the system may include one or more operations control centers connected to the automation system and configured to enable a user to perform one or more of: monitoring the surveillance area based on the plurality of data elements; configuring the automation system: or evaluating and responding to the emergency situation.

In Example 3, the subject matter of any one of Examples 1 to 2 may optionally include that the plurality of sensors may include one or more of video sensors, audio sensors, text sensors, weather sensors, traffic sensors, or building control sensors.

In Example 4, the subject matter of any one of Examples 1 to 3 may optionally include that the plurality of sensors may include sensors equipped on mobile devices carried by the first responders.

In Example 5, the subject matter of any one of Examples 1 to 4 may optionally include that the plurality of data elements may include raw data and metadata. A piece of metadata is data that provides information about one or more pieces of raw data. The metadata may be collected by the plurality of sensors or may be derived from the raw data.

In Example 6, the subject matter of any one of Examples 1 to 5 may optionally include that the set of features may include one or more of representations, structures, anomalies, behaviors, or patterns.

In Example 7, the subject matter of any one of Examples 1 to 6 may optionally include that, to identify the emergency situation based on the set of features and the set of rules, the automation system may be configured to match the set of features with the set of rules.

In Example 8, the subject matter of any one of Examples 1 to 7 may optionally include that the automation system may be further configured to assess the priority of the emergency situation based on a set of data elements associated with the emergency situation and a set of policies.

In Example 9, the subject matter of Example 8 may optionally include that, to select the responder, the automation system may be configured to determine the number of responders that is allocated from each type of responders based on at least one of the priority of the emergency situation or the type of the emergency situation.

In Example 10, the subject matter of any one of Examples 1 to 9 may optionally include that the automation system may be further configured to assign a set of responders to the area based on a profile based on a set of pre-conditions, acquired ground conditions, and evaluation indexes.

In Example 11, the subject matter of Example 10 may optionally include that the automation system may be further configured to assign different quantities of responders of different types or assets to each of a plurality of regions.

In Example 12, the subject matter of any one of Examples 1 to 11 may optionally include that the automation system may be further configured to send alerts to the selected responder and public based on the identified emergency situation.

In Example 13, the subject matter of any one of Examples 8 to 12 may optionally include that the automation system may be further configured to control accessibility from user to at least one component included in the automation system based on the set of rules and the priority.

In Example 14, the subject matter of any one of Examples 8 to 13 may optionally include that the automation system may be further configured to manage a system resource based on the set of rules and the priority of the emergency situation.

In Example 15, the subject matter of any one of Examples 8 to 14 may optionally include that the automation system may be further configured to manage storage duration indicating a term during which the plurality of data elements is stored in a storage medium based on the set of rules and the priority of the emergency situation and delete the plurality of data elements after the storage duration is elapsed.

In Example 16, the subject matter of any one of Examples 8 to 15 may optionally include that the automation system may be further configured to control the plurality of sensors for tracking the emergency situation when the priority of the emergency situation is assessed as high priority.

In Example 17, the subject matter of Example 16 may optionally include that the automation system may be further configured to send a mobile object to the emergency situation. The mobile object may have a sensor for monitoring and tracking the emergency situation.

In Example 18, the subject matter of any one of Examples 1 to 17 may optionally include that the automation system may be further configured to accept modification of the set of rules at any time while the automation system is in operation and update the set of rules in response to the accepting of the modification.

In Example 19, the subject matter of Example 18 may optionally include that the automation system may be further configured to provide a graphical user interface to accept a trajectory depicted on a video feed as a modification of the set of rules.

In Example 20, the subject matter of any one of Examples 2 to 19 may optionally include that the one or more operations control centers may be further configured to provide a visualizing interface to show at least one of the number of identified emergency situations, a type of the identified emergency situations, the number of emergency situations of which priority is high, a priority of the emergency situations and a map indicating a location and a density of the emergency situations.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C." "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An automated surveillance system, comprising:
   an automation system configured to:
     receive a plurality of data elements regarding a surveillance area from a plurality of sensors;
     detect different types of objects or events from the plurality of data elements;
     extract a set of features of the different types of objects or events;
     identify an emergency situation based on the set of features and a set of rules;
     select a responder in response to the identified emergency situation; and
     dispatch the selected responder to an area related to the identified emergency situation,
     wherein the automation system is further configured to assess a priority of the emergency situation based on a set of data elements associated with the emergency situation and a set of policies, and
     wherein the automation system is further configured to manage storage duration indicating a term during which the plurality of data elements is stored in a storage medium based on the set of rules and the priority of the emergency situation and delete the plurality of data elements after the storage duration is elapsed.

2. The automated surveillance system of claim 1, further comprising:
one or more operations control centers connected to the automation system and configured to enable a user to perform one or more of:
monitoring the surveillance area based on the plurality of data elements;
configuring the automation system; or
evaluating and responding to the emergency situation.

3. The automated surveillance system of claim 1, wherein the plurality of sensors comprises one or more of video sensors, audio sensors, text sensors, weather sensors, traffic sensors, or building control sensors.

4. The automated surveillance system of claim 1, wherein the plurality of sensors comprises sensors equipped on mobile devices carried by first responders.

5. The automated surveillance system of claim 1, wherein the plurality of data elements comprises raw data and metadata, wherein a piece of metadata is data that provides information about one or more pieces of raw data, wherein the metadata is collected by the plurality of sensors or derived from the raw data.

6. The automated surveillance system of claim 1, wherein the set of features comprises one or more of representations, structures, anomalies, behaviors, or patterns.

7. The automated surveillance system of claim 1, wherein, to identify the emergency situation based on the set of features and the set of rules, the automation system is configured to match the set of features with the set of rules.

8. The automated surveillance system of claim 1, wherein, to select the responder, the automation system is configured to determine a number of responders that is allocated from each type of responders based on at least one of the priority of the emergency situation or a type of the emergency situation.

9. The automated surveillance system of claim 1, wherein the automation system is further configured to assign a set of responders to the area based on a profile based on a set of pre-conditions, acquired ground conditions, and evaluation indexes.

10. The automated surveillance system of claim 9, wherein the automation system is further configured to assign different quantities of responders of different types or assets to each of a plurality of regions.

11. The automated surveillance system of claim 1, wherein the automation system is further configured to send alerts to the selected responder and public based on the identified emergency situation.

12. The automated surveillance system of claim 1, wherein the automation system is further configured to control accessibility from user to at least one component included in the automation system based on the set of rules and the priority.

13. The automated surveillance system of claim 1, wherein the automation system is further configured to manage a system resource based on the set of rules and the priority of the emergency situation.

14. The automated surveillance system of claim 1, wherein the automation system is further configured to control the plurality of sensors for tracking the emergency situation when the priority of the emergency situation is assessed as high priority.

15. The automated surveillance system of claim 14, wherein the automation system is further configured to send a mobile object to the emergency situation, the mobile object has a sensor for monitoring and tracking the emergency situation.

16. The automated surveillance system of claim 1, wherein the automation system is further configured to accept modification of the set of rules at any time while the automation system is in operation and update the set of rules in response to the accepting of the modification.

17. The automated surveillance system of claim 16, wherein the automation system is further configured to receive user input defining a suspicious trajectory through a graphical user interface, wherein the automation system is further configured to modify the set of rules based on the user input.

18. The automated surveillance system of claim 2, wherein the one or more operations control centers are further configured to provide a visualizing interface to show at least one of the number of identified emergency situations, a type of the identified emergency situations, the number of emergency situations of which priority is high, a priority of the emergency situations and a map indicating a location and a density of the emergency situations.

19. An automated surveillance system, comprising:
an automation system configured to:
receive a plurality of data elements regarding a surveillance area from a plurality of sensors;
detect at least a first object or event and a second object or event from the plurality of data elements;
extract a set of features of the first and the second object or event in parallel; and
identify an emergency situation based on the set of features and a set of rules;
assess a priority of the emergency situation based on a set of data elements associated with the emergency situation and a set of policies; and
manage storage duration indicating a term during which the plurality of data elements is stored in a storage medium based on the set of rules and the priority of the emergency situation and delete the plurality of data elements after the storage duration is elapsed.

20. An automated surveillance system, comprising:
an automation system configured to:
receive a plurality of data elements regarding a surveillance area from a plurality of sensors;
extract a set of features from the plurality of data elements;
identify an emergency situation based on the set of features and a set of rules;
assess a priority of the emergency situation based on a set of data elements associated with the emergency situation and a set of policies;
assess a priority of the emergency situation based on a set of data elements associated with the emergency situation and a set of policies;
manage storage duration indicating a term during which the plurality of data elements is stored in a storage medium based on the set of rules and the priority of the emergency situation and delete the plurality of data elements after the storage duration is elapsed;
optimize a deployment of first responders by utilizing the history analytics;
select a responder in response to the assessed priority and optimized deployment;
dispatch the selected responder to an area related to the identified emergency situation.

21. The automated surveillance system of claim 20, wherein, to select the responder, the automation system is configured to determine a number of responders that is allocated from each type of responders based on at least one of the priority of the emergency situation or a type of the emergency situation.

22. The automated surveillance system of claim 20, wherein the automation system is further configured to assign a set of responders to the area based on a profile based on a set of pre-conditions, acquired ground conditions, and evaluation indexes.

23. The automated surveillance system of claim 22, wherein the automation system is further configured to assign different quantities of responders of different types or assets to each of a plurality of regions.

24. The automated surveillance system of claim 20, wherein the automation system is further configured to send alerts to the selected responder and public based on the identified emergency situation.

25. The automated surveillance system of claim 20, wherein the automation system is further configured to control accessibility from user to at least one component included in the automation system based on the set of rules and the priority.

26. The automated surveillance system of claim 20, wherein the automation system is further configured to manage a system resource based on the set of rules and the priority of the emergency situation.

\* \* \* \* \*